United States Patent
Yamamoto et al.

(10) Patent No.: US 8,408,729 B2
(45) Date of Patent: Apr. 2, 2013

(54) LIGHTING DEVICE, DISPLAY DEVICE AND TELEVISION RECEIVER

(75) Inventors: Shuki Yamamoto, Osaka (JP); Tamotsu Satoh, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 316 days.

(21) Appl. No.: 12/864,559

(22) PCT Filed: Jan. 21, 2009

(86) PCT No.: PCT/JP2009/050875
§ 371 (c)(1),
(2), (4) Date: Jul. 26, 2010

(87) PCT Pub. No.: WO2009/104447
PCT Pub. Date: Aug. 27, 2009

(65) Prior Publication Data
US 2011/0007230 A1    Jan. 13, 2011

(30) Foreign Application Priority Data

Feb. 19, 2008  (JP) .................................. 2008-037513

(51) Int. Cl.
*G09F 13/04* (2006.01)
(52) U.S. Cl. .................. 362/97.2; 362/561; 362/581
(58) Field of Classification Search .................. 362/561, 362/581, 97.2; 313/582–587
See application file for complete search history.

(56) References Cited

U.S. PATENT DOCUMENTS

| | | | |
|---|---|---|---|
| 6,445,430 | B1 | 9/2002 | Sakamoto et al. |
| 2002/0196384 | A1 | 12/2002 | Sakamoto et al. |
| 2006/0164858 | A1* | 7/2006 | Park et al. .................. 362/561 |
| 2009/0122216 | A1 | 5/2009 | Kogure et al. |

FOREIGN PATENT DOCUMENTS

| | | |
|---|---|---|
| JP | 2001-075095 A | 3/2001 |
| JP | 2006-235128 A | 9/2006 |
| JP | 2007-087916 A | 4/2007 |
| JP | 2007-299595 A | 11/2007 |

OTHER PUBLICATIONS

Official Communication issued in International Patent Application No. PCT/JP2009/050875, mailed on Apr. 7, 2009.

* cited by examiner

*Primary Examiner* — Anne Hines
(74) *Attorney, Agent, or Firm* — Keating & Bennett, LLP

(57) ABSTRACT

A lighting device 12 of the present invention includes a plurality of light sources 17 and a chassis 14 that accommodates the light sources 17. The chassis 14 is formed of a plate member and includes a bottom plate 14a of a flat plate and outer rims 21 having a folding configuration formed at the edges of the bottom plate 14a. The outer rim 21 includes a first folded portion 31 and a second folded portion 32 that is formed by further folding a part of the first folded portion 31. Since the outer rim 21 has a double folding configuration, strength of the outer rim 21 itself is increased to suppress distortion of the chassis 14. Accordingly, uniform brightness is provided.

14 Claims, 24 Drawing Sheets

LIGHTING DEVICE, DISPLAY DEVICE AND TELEVISION RECEIVER

TECHNICAL FIELD

The present invention relates to a lighting device, a display device and a television receiver.

BACKGROUND ART

A liquid crystal panel included in a liquid crystal display device such as a television does not emit light, and thus a backlight device is required as a separate lighting device. The backlight device is arranged behind the liquid crystal panel (i.e., on a side opposite from a display surface side). It includes a metal chassis having an opening on a liquid crystal panel side and a plurality of lamps (e.g., cold cathode tubes).

To make the liquid crystal display device thinner and lighter, each component of the liquid crystal panel and the backlight device has been made thinner and lighter. The reduction in thickness and weight of the components decreases strength of the components and accordingly lowers durability or display quality of the liquid crystal display device. To suppress the strength decrease of the components due to the weight reduction of the liquid crystal display device, the configuration as disclosed in Patent Document 1 has been known.

In the liquid crystal display device disclosed in Patent Document 1, the liquid crystal panel is sandwiched between the panel fixing fitting and the panel holder. A first stopper holds the panel fixing fitting and a chassis so as to connect them together. The panel holder is formed of plastic and in a frame and ribs are extended therefrom in the thickness direction so as to be parallel to each other. Accordingly, since the panel holder, which has been made of metal, is made of plastic, the liquid crystal display device is reduced in weight, and the ribs are extended in the thickness direction of the panel holder to suppress its strength decrease.

[Patent Document] Japanese Unexamined Patent Publication No. 2006-235128

(Problem to be Solved by the Invention)

To make the liquid crystal display device thinner, it is effective to make a chassis provided in the backlight device thinner. The chassis is generally formed of a plate member and comprised of a bottom plate and an outer rim that extends upright from a periphery of the bottom plate. To make the chassis thinner, a height from the bottom plate to an upper end of the outer rim of the chassis is required to be small. The outer rim of the chassis has a function for maintaining strength of the whole chassis. Therefore, if the height of the outer rim is small, the strength of the outer rim itself is decreased and a force for suppressing distortion of the chassis may become insufficient. If a part of the chassis gets distorted, the gaps between each cold cathode tube accommodated in the chassis and the chassis become varied. This may vary the amount of light emission from each cold cathode tube and this may lower display quality of the liquid crystal display device.

DISCLOSURE OF THE PRESENT INVENTION

The present invention was made in view of the foregoing circumstances. An object of the present invention is to provide a lighting device having a uniform brightness distribution with using a chassis for suppressing its strength decrease due to thickness reduction. Another object of the present invention is to provide a display device including such a lighting device and a television receiver including such a display device.

(Means for Solving the Problem)

To solve the above problem, a lighting device of the present invention includes a plurality of light sources and a chassis configured to accommodate the light sources. The chassis includes a bottom plate and an outer rim that is formed at an edge of the bottom plate and formed by bending a plate member. The outer rim includes a first folded portion and a second folded portion that is formed by further folding the plate member that includes the first folded portion.

A double folding configuration having the first folded portion and the second folded portion that is formed by further folding a part of the first folded portion is provided at the outer rim that is formed at the edge of the bottom plate of the chassis. This improves strength of the outer rim and suppresses distortion of the whole chassis.

The outer rim having the folding configuration that is provided at the edge of the bottom plate of the chassis has a function for applying strength that is required to suppress the distortion of the chassis of a plate shape. However, especially in the thin chassis, a height from the bottom plate to an upper edge of the outer rim is small. Therefore, the strength of the outer rim is decreased compared to the conventional chassis. This decreases the strength of the whole chassis and may cause distortion of the chassis.

If the distortion is caused in the chassis, a distance between each light source accommodated in the chassis and the chassis may be varied. If the chassis is made of a metal, a small amount of leakage is caused from the light source and the leakage amount is inversely proportional to the distance between the light source and the chassis. Therefore, if the distance between each light source and the chassis is different due to the distortion of the chassis, the leakage amount from each light source is varied. In a case in that a large distance between the light sources and the chassis can be ensured, even if the distance therebetween is changed due to the distortion of the chassis, the variation of the leakage amount in the light sources is small since the distance change amount with respect to the design distance is relatively small. Accordingly, this does not affect the variation of current flowing in the light sources. However, since the distance between the light sources and the chassis is small in the thin chassis, the distance change amount with respect to the design distance is relatively great. As a result, this increases the variation of current flowing in the light sources, and accordingly the brightness of each light source may be different.

However, in the lighting device of the present invention, the outer rim has a folding configuration comprising the first folded portion and the second folded portion that is formed by folding the plate member that forms the first folded portion. This improves the strength of the whole chassis and does not cause distortion in the thin chassis. Accordingly, since the distance between the light sources and the chassis is maintained to be the design distance, the leakage amount from each light source to the chassis is constant and this does not affect the variation of current flowing in the light sources, that is, the variation of brightness. As a result, especially in the thin lighting device, a uniform light brightness distribution is ensured.

BEST MODE FOR CARRYING OUT THE INVENTION

<First Embodiment>

The first embodiment of the present invention will be explained with reference to FIGS. 1 to 6. In the first embodiment, a television receiver TV including a liquid crystal display device 10 will be explained.

Figure 1:
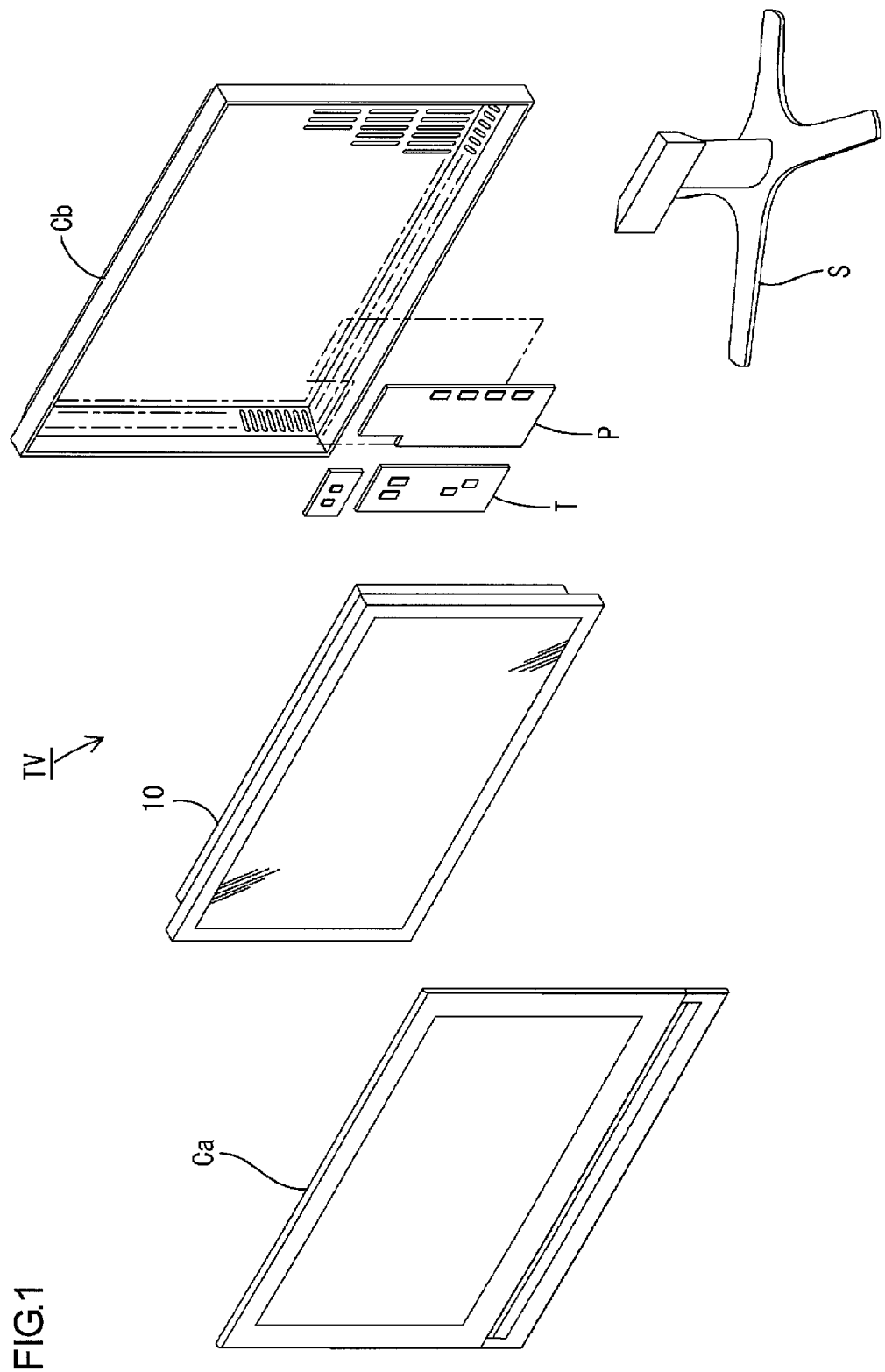
FIG. 1 is an exploded perspective view illustrating a general construction of a television receiver according to a first embodiment of the present invention.
Figure 2:
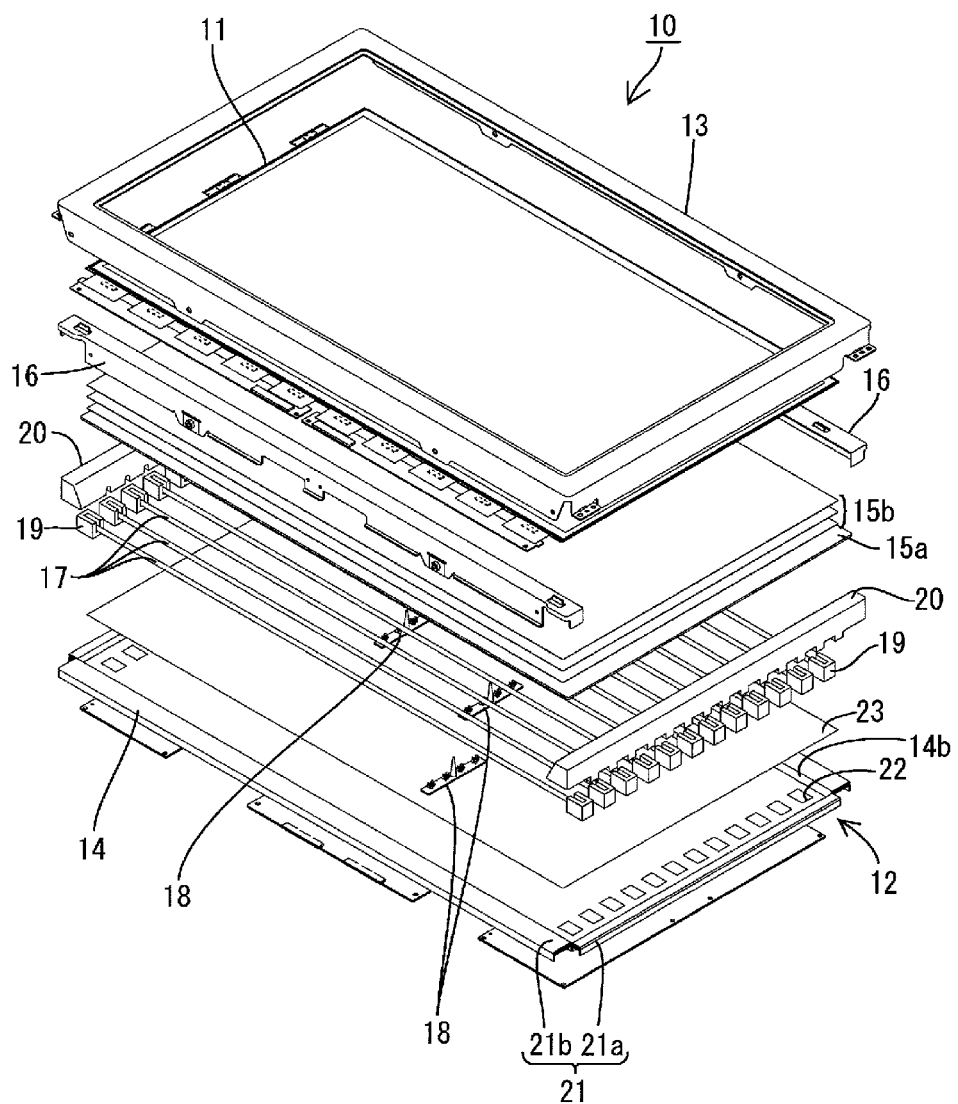
FIG. 2 is an exploded perspective view illustrating a general construction of a liquid crystal display device provided in the television receiver shown in FIG. 1.
Figure 3:
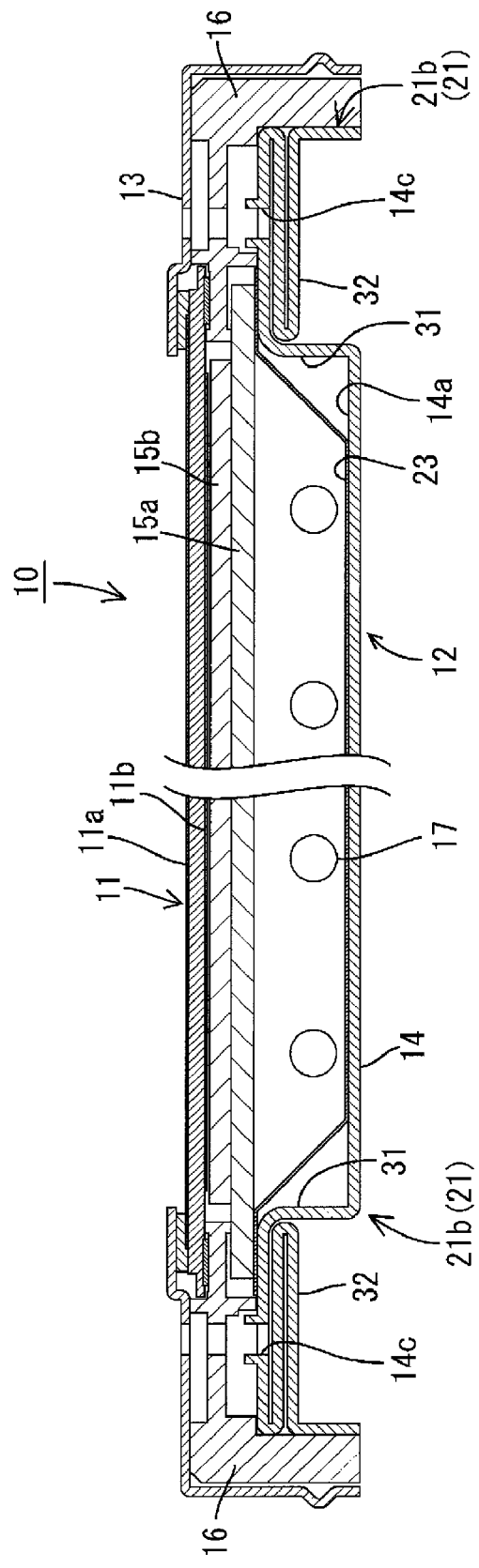
FIG. 3 is a cross-sectional view of the liquid crystal display device in FIG. 2 along the short-side direction.
Figure 4:
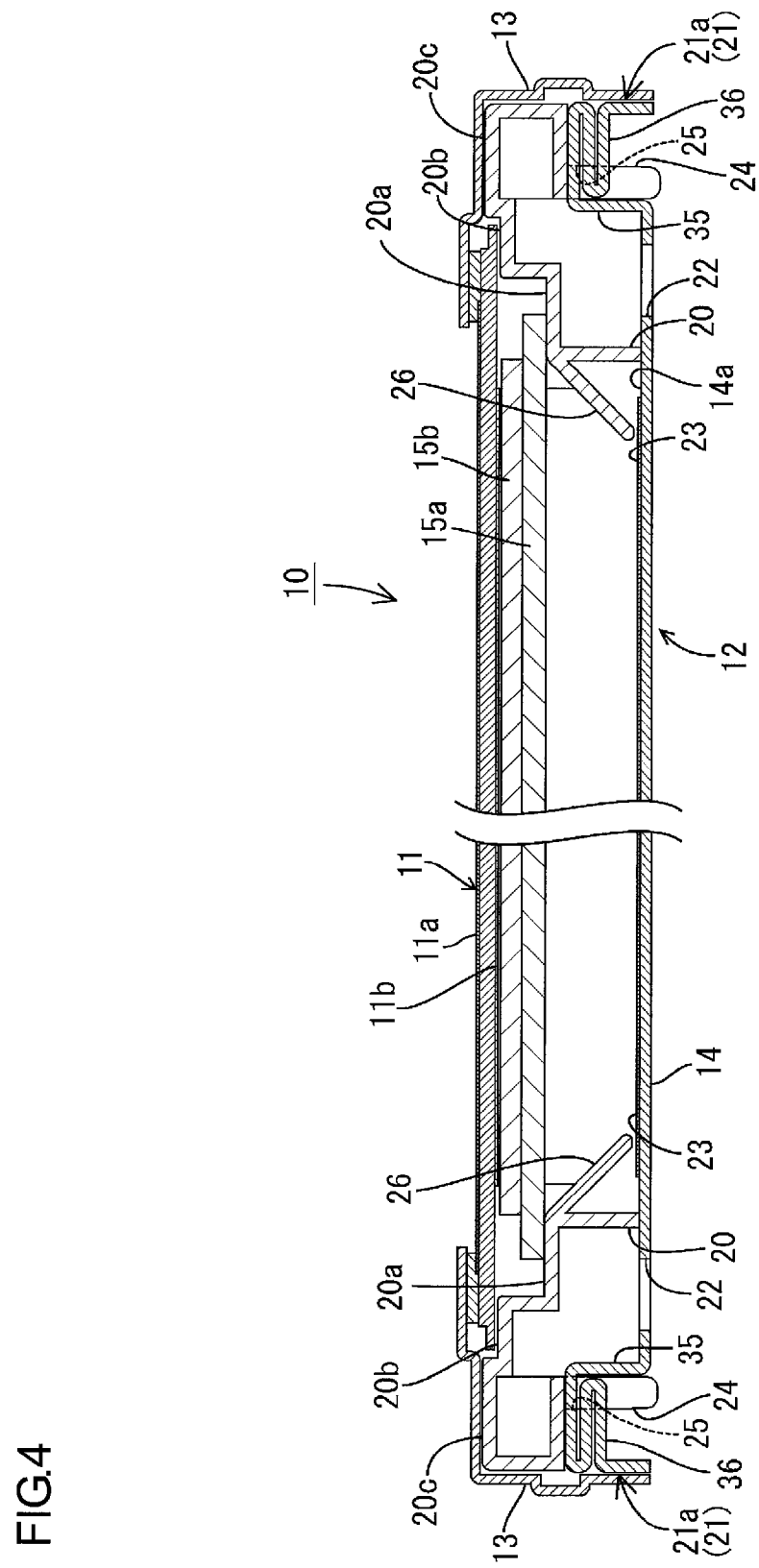
FIG. 4 is a cross-sectional view of the liquid crystal display device in FIG. 2 along the long-side direction.
Figure 5:
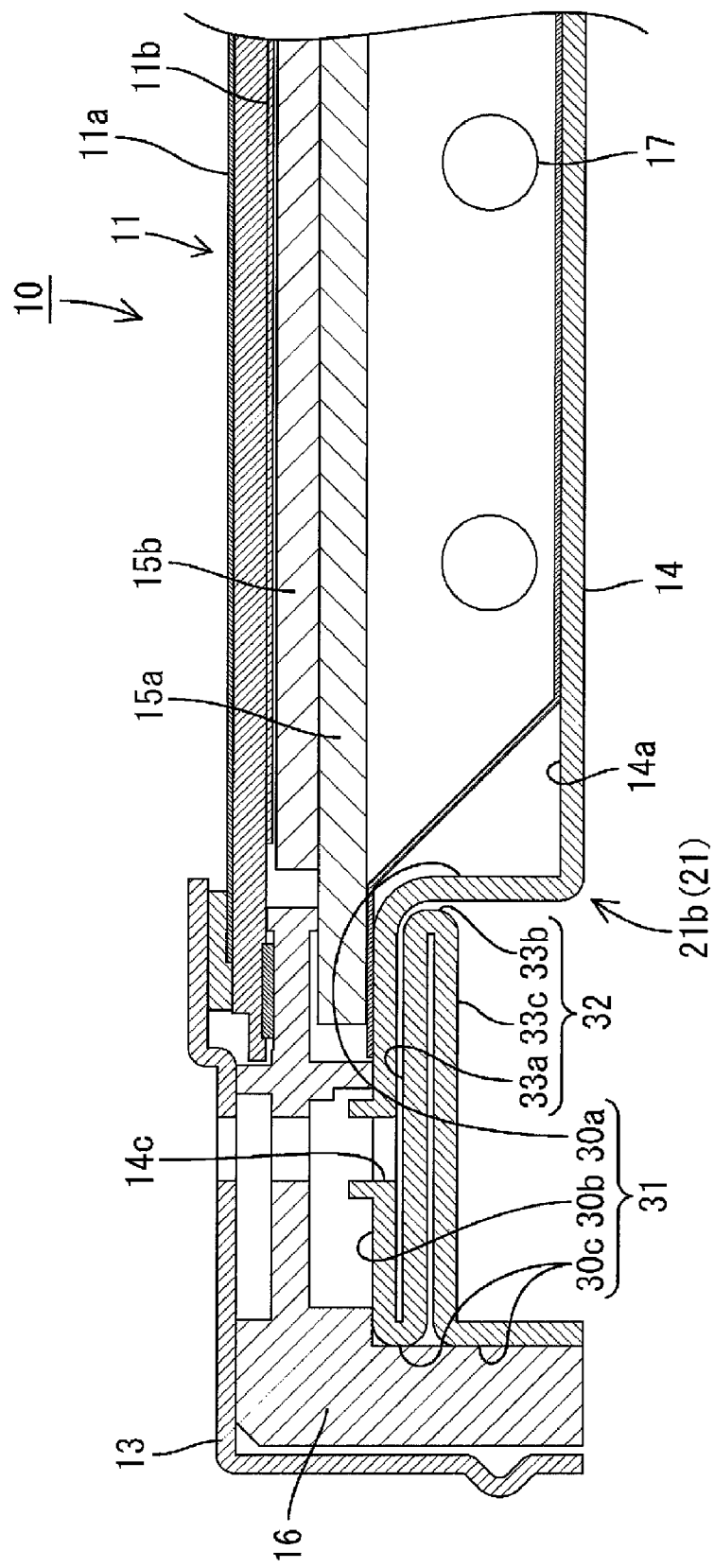
FIG. 5 is an enlarged cross-sectional view of a main portion of the liquid crystal display device in FIG. 3.
Figure 6:
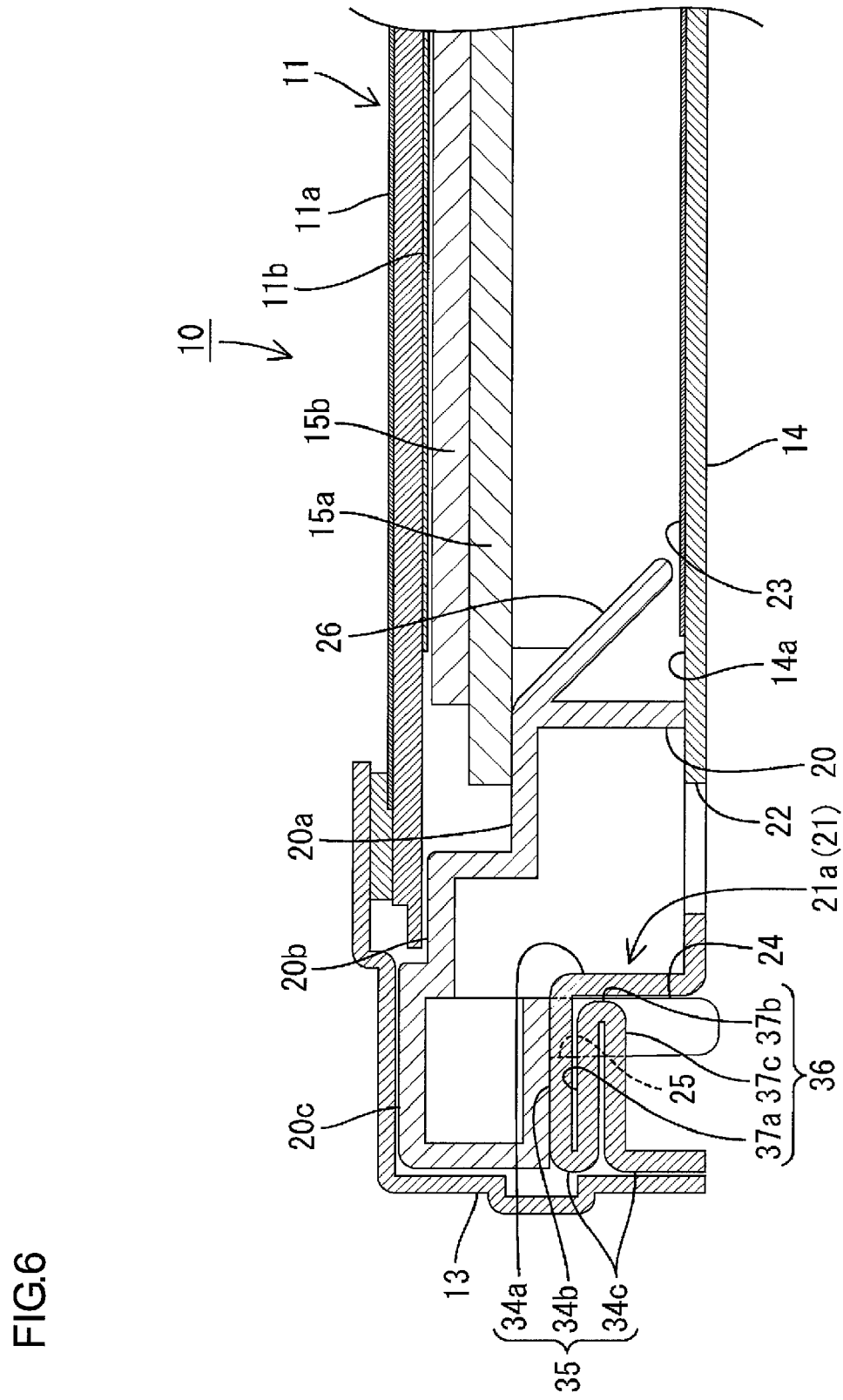
FIG. 6 is an enlarged cross-sectional view of a main portion of the liquid crystal display device in FIG. 4

FIG. 1 is an exploded perspective view illustrating a general construction of the television receiver according to the first embodiment. FIG. 2 is an exploded perspective view illustrating a general construction of the liquid crystal display device provided in the television receiver shown in FIG. 1. FIG. 3 is a cross-sectional view of the liquid crystal display device in FIG. 2 along the short-side direction. FIG. 4 is a cross-sectional view of the liquid crystal display device in FIG. 2 along the long-side direction. FIG. 5 is an enlarged cross-sectional view of a main portion of the liquid crystal display device in FIG. 3. FIG. 6 is an enlarged cross-sectional view of a main portion of the liquid crystal display device in FIG. 4.

As illustrated in FIG. 1, the television receiver TV of the present embodiment includes the liquid crystal display device 10, front and rear cabinets Ca, Cb that house the liquid crystal display device 10 therebetween, a power source P, a tuner T and a stand S. An overall shape of the liquid crystal display device (display device) 10 is a landscape rectangular. The liquid crystal display device 10 is housed in a vertical position. As illustrated in FIG. 2, it includes a liquid crystal panel 11 as a display panel, and a backlight device 12 (lighting device), which is an external light source. They are integrally held by a bezel 13 and the like.

Next, the liquid crystal panel 11 and the backlight device 12 included in the liquid crystal display device 10 will be explained (see FIGS. 2 to 4).

The liquid crystal panel (display panel) 11 is constructed such that a pair of glass substrates is bonded together with a predetermined gap therebetween and liquid crystal is sealed between the glass substrates. On one of the glass substrates, switching components (e.g., TFTs) connected to source lines and gate lines that are perpendicular to each other, pixel electrodes connected to the switching components, and an alignment film are provided. On the other substrate, color filter having color sections such as R (red), G (green) and B (blue) color sections arranged in a predetermined pattern, counter electrodes, and an alignment film are provided. Polarizing plates 11a, 11b are attached to outer surfaces of the substrates (see FIGS. 3 and 4).

As illustrated in FIG. 2, the backlight device 12 includes a chassis 14, a diffuser plate 15a, a plurality of optical sheets 15b and frames 16. The chassis 14 has a substantially box-shape and an opening 14b on the light emitting side (on the liquid crystal panel 11 side). The diffuser plate 15a are arranged so as to cover the opening 14b of the chassis 14. The optical sheets 15b are arranged between the diffuser plate 15a and the liquid crystal panel 11. The frames 16 arranged along the long sides of the chassis 14 hold the long-side edges of the diffuser plate 15a to the chassis 14. The long-side edges of the diffuser plate 15a are sandwiched between the chassis 14 and the frames 16. Cold cathode tubes (light sources) 17, lamp clips 18, relay connectors 19 and lamp holders 20 are installed in the chassis 14. The lamp clips 18 are provided for mounting the cold cathode tube 17 to the chassis 14. The relay connectors 19 are connected to ends of the cold cathode tubes 17 for making electrical connection. The lamp holders 20 collectively cover ends of the cold cathode tubes 17 and the relay connectors 19. A light emitting side of the backlight device 12 is a side closer to the diffuser plate 15a than the cold cathode tubes 17.

The chassis 14 is prepared by processing a metal plate. It is formed in a substantially shallow box shape. It includes a rectangular bottom plate 14a and outer rims 21 (short-side outer rims 21a and long-side outer rims 21b), each of which extends upright from the corresponding side of the bottom plate 14a and has a substantially U shape. The bottom plate 14a of the chassis 14 has a plurality of mounting holes 22 at two ends of the bottom plate 14a in the long-side edges thereof. The relay connectors 19 are mounted in the mounting holes 22. As illustrated in FIG. 3, fixing holes 14c are provided in the upper surface of the chassis 14 along the long-side outer rims 21b to bind the bezel 13, the frames 16 and the chassis 14 together with screws and the like.

A light reflecting sheet 23 is disposed on an inner surface of the bottom plate 14a of the chassis 14 (on a side that faces the cold cathode tubes 17). The light reflecting sheet 23 is a synthetic resin sheet having a surface in white color that provides high light reflectivity. It is placed so as to cover almost entire inner surface of the bottom plate 14a of the chassis 14. As illustrated in FIG. 3, long-side edges of the light reflecting sheet 23 are lifted so as to cover the long-side outer rims 21b of the chassis 14 and sandwiched between the chassis 14 and the diffuser plate 15a. With this light reflecting sheet 23, light emitted from the cold cathode tubes 17 is reflected toward the diffuser plate 15a.

On the opening 14b side of the chassis 14, the diffuser plate 15a and the optical sheets 15b are provided. The diffuser plate 15a includes a synthetic resin plate containing scattered light diffusing particles. It diffuses linear light emitted from the cold cathode tubes 17 that is a tubular light source. The short-side edges of the diffuser plate 15a are placed on the first surface 20a of the holder 20 as described above, and does not receive a vertical force. As illustrated in FIG. 3, the long-side edges of the diffuser plate 15a are sandwiched between the chassis 14 (the reflecting sheet 23) and the frame 16 and fixed.

The optical sheets 15b provided on the diffuser plate 15a include a diffuser sheet, a lens sheet and a reflecting type polarizing plate layered in this order from the diffuser plate 15a side. Light emitted from the cold cathode tubes 17 passes through the diffuser plate 15a and enters the optical sheets 15b. The optical sheets 15b convert the light to planar light. The liquid crystal display panel 11 is disposed on the top surface of the top layer of the optical sheets 15b. The optical sheets 15b are held between the diffuser plate 15a and the liquid crystal panel 11.

Each cold cathode tube 17 has an elongated tubular shape. A plurality of the cold cathode tubes 17 are installed in the chassis 14 such that they are arranged parallel to each other with the long-side direction thereof (the axial direction) aligned along the long-side direction of the chassis 14 (see FIG. 2). Each end of each cold cathode tube 17 is fitted in the corresponding relay connector 19. The holders 20 are mounted so as to cover the relay connectors 19.

The diameter of each cold cathode tube 17 used in this embodiment is 4.0 mm. The distance between the cold cathode tubes 17 and the bottom plate 14a of the chassis 14 is 0.8 mm. The distance between the adjacent cold cathode tubes 17 is 16.4 mm. The distance between the cold cathode tubes 17 and the diffuser plate 15a is 2.7 mm. In this backlight device 12, distances between the components are defined so as to reduce the thickness of the backlight device 12. Especially, the distance between the cold cathode tubes 17 and the diffuser plate 15a and the distance between the cold cathode tubes 17 and the bottom plate 14a of the chassis 14 are reduced. Because of the thickness reduction of the lighting device 12, the liquid crystal display device 10 and that of the television receiver TV are provided with the following thickness. The thickness of the liquid crystal display device 10 (i.e., the thickness between the front surface of the liquid crystal panel 11 and the back surface of the backlight device 12) is 16 mm. The thickness of the television receiver TV (i.e., the thickness between the front surface of the front cabinet Ca and the back surface of the rear cabinet Cb) is 34 mm. Namely, a thin television receiver is provided.

The holders 20 that cover the ends of the cold cathode tubes 17 are made of white synthetic resin. Each of them has an elongated substantially box shape that extends along the short side of the chassis 14. As illustrated in FIG. 4, each holder 20 has steps on the front side such that the diffuser plate 15a and the liquid crystal panel 11 are held at different levels. A part of the holder 20 is placed on top of apart of the corresponding short-side outer rim 21a of the chassis 14 and forms a side wall of the backlight device 12 together with the short-side outer rim 21a. An insertion pin 24 projects from a surface of the holder 20 that faces the short-side outer rim 21a of the chassis 14. The holder 20 is mounted to the chassis 14 by inserting the insertion pin 24 into the insertion hole 25 provided in the top surface of the short-side outer rim 21a of the chassis 14.

The steps of the holder 20 include three surfaces parallel to the bottom plate 14a of the chassis 14. The short edge of the diffuser plate 15a is placed on the first surface 20a located at the lowest level. A sloped cover 26 extends from the first surface 20a toward the bottom plate 14a of the chassis 14. A short edge of the liquid crystal panel 11 is placed on the second surface 20b of the steps of the holder 20. The third surface 20c located at the highest level of the steps of the holder 20 is provided such that it overlaps the short-side outer rim 21a of the chassis 14 and comes in contact with the bezel 13.

As illustrated in FIG. 5, each long-side outer rim 21b has a long-side first folded portion (first folded portion) 31 that has a substantially U shape. The long-side first folded portion 31 includes a first inner plate portion (first plate portion) 30a, a first upper plate portion (second plate portion) 30b and a first outer plate portion (third plate portion) 30c. The first inner plate portion 30a extends upwardly substantially vertically from the bottom plate 14a of the chassis 14. The first upper plate portion 30b is bent from the first inner plate portion 30a toward the outside of the chassis 14 so as to be substantially parallel to the bottom plate 14a (in a direction crossing to the first inner plate portion 30a). The first outer plate portion 30c is bent substantially vertically from the first upper plate portion 30b toward the bottom plate 14a. A height from the bottom plate 14a to the first upper plate portion 30b corresponds to a maximum height of the chassis 14 and is set to be 8.0 mm. The first outer plate portion 30c that forms the long-side first folded portion 31 is further bent at a position closer to the first upper plate portion 30b in a substantially U shape. Accordingly, a long-side second folded portion (second folded portion) 32 is formed. In the present embodiment, the long-side second folded portion 32 is projected from the first outer plate portion 30c so as to overlap the first upper plate portion 30b.

The long-side second folded portion 32 includes a second upper plate portion 33a, a second inner plate portion 33b and a second lower plate portion 33c. The second upper plate portion 33a is formed by bending a part of the first outer plate portion 30c substantially vertically to extend along the first upper plate portion 30b. The second inner plate portion 33b is bent from the second upper plate portion 33a so as to be substantially parallel to the first outer plate portion 30c. The second lower plate portion 33c is bent substantially vertically from the second inner plate portion 33b toward the first outer plate portion 30c. There is a small gap between the second upper plate portion 33a of the long-side second folded portion 32 and the first upper plate portion 30b of the long-side first folded portion 31. Also, there is a small gap between the second inner plate portion 33b and the first inner plate portion 30a. In other words, the long-side second folded portion 32 is provided so as to extend in a longitudinal direction (a long side of the chassis 14) of the long-side outer rim 21b so that the plate portions 33a, 33b, 33c of the long-side second folded portion 32 do not contact the long-side first folded portion 31. The long-side second folded portion 32 is formed in the folded part of the long-side first folded portion 31 so as to be closer to the first upper plate portion 30b of the long-side first folded portion 31.

As described above, in the present embodiment, the long-side first folded portion 31 forms an outer appearance of the long-side outer rim 21b, and the long-side second folded portion 32 is formed by folding a part of the first outer plate portion 30c of the long-side first folded portion 31 and provided in the long-side first folded portion 31 so as to overlap the first upper plate portion 30b.

As illustrated in FIG. 6, each short-side outer rim 21a has a short-side first folded portion (first folded portion) 35 that has a substantially U shape. The short-side first folded portion 35 includes a third inner plate portion 34a, a third upper plate portion 34b and a third outer plate portion 34c. The third inner plate portion 34a extends upwardly substantially vertically from the bottom plate 14a of the chassis 14. The third upper plate portion 34b is bent from the third inner plate portion 34a toward the outside of the chassis 14 so as to be substantially parallel to the bottom plate 14a. The third outer plate portion 34c is bent substantially vertically from the third upper plate portion 34b toward the bottom plate 14a. The third outer plate portion 34c that forms the short-side first folded portion 35 is further bent at a position closer to the third upper plate portion 34b in a substantially U shape. Accordingly, a short-side second folded portion (second folded portion) 36 is formed. In the present embodiment, the short-side second folded portion 36 is projected from the third outer plate portion 34c so as to overlap the third upper plate portion 34b.

The short-side second folded portion 36 includes a fourth upper plate portion 37a, a fourth inner plate portion 37b and a fourth lower plate portion 37c. The fourth upper plate portion 37a is formed by bending a part of the third outer plate portion 34c substantially vertically to extend along the third upper plate portion 34b. The fourth inner plate portion 37b is bent from the fourth upper plate portion 37a so as to be substantially parallel to the third outer plate portion 34c. The fourth lower plate portion 37c is bent substantially vertically from the fourth inner plate portion 37b toward the third outer plate portion 34c. There is a small gap between the fourth upper plate portion 37a of the short-side second folded portion 36 and the third upper plate portion 34b of the short-side first folded portion 35. Also, there is a small gap between the fourth inner plate portion 37b and the third inner plate portion 34a. In other words, the short-side second folded portion 36 is provided so as to extend in a longitudinal direction (a short side of the chassis 14) of the short-side outer rim 21a so that the plate portions 37a, 37b, 37c of the short-side second folded portion 36 do not contact the short-side first folded portion 35. The short-side second folded portion 36 is formed in the folded part of the short-side first folded portion 35 so as to be closer to the third upper plate portion 34b of the short-side first folded portion 35.

As described above, in the present embodiment, the short-side first folded portion 35 forms an outer appearance of the short-side outer rim 21a, and the short-side second folded portion 36 is formed by folding a part of the third outer plate portion 34c of the short-side first folded portion 35 and provided in the short-side first folded portion 35 so as to overlap the third upper plate portion 34b.

The television receiver TV, the liquid crystal display device 10 and the backlight device 12 of the present embodiment including the above-described configurations provide the following operational effects.

The chassis 14 provided in the backlight device 12 of the present embodiment has the flat bottom plate 14a and the outer rims 21 (the long-side outer rims 21b and the short-side outer rims 21a) that are formed on the edges of the bottom plate 14a and have folding configurations. The folding configuration of each long-side outer rim 21b is a double folding configuration including the long-side first folded portion 31 and the long-side second folded portion 32 that is formed by folding a part of the long-side first folded portion 31. The folding configuration of each short-side outer rim 21a is a double folding configuration including the short-side first folded portion 35 and the short-side second folded portion 36 that is formed by folding a part of the short-side first folded portion 35.

Thus, the outer rims 21 have the double folding configuration comprising the first folded portion 31, 35 and the second folded portion 32, 36. This improves the strength of the outer rims 21 and suppresses distortion of the whole chassis 14. Especially in the present embodiment, the maximum vertical height of the outer rims 21 with respect to the bottom plate 14a is set to be 8.0 mm that is a distance between the first upper plate portion 30b of the long-side outer rim 21b and the bottom plate 14a. Therefore, in the outer rim 21 that is made thinner such that its height from the bottom plate 14a is set to be 10.0 mm or less, the above-described double folding configuration is especially effective for applying strength to the outer rim 21.

According to the configuration of the present invention, distortion of the chassis 14 is suppressed. Therefore, the distance between the cold cathode tubes 17 and the bottom plate 14a of the chassis 14 can be maintained to be constant. Accordingly, the leakage amount from every cold cathode tube 17 to the chassis 14 becomes constant and the amount of light emission from each cold cathode tube 17 is same. Therefore, the backlight device 12 obtains a uniform brightness distribution.

In the present embodiment, the first folded portions 31, 35 are folded in a substantially U shape, and each second folded portion 32, 36 is provided inside the substantially U shape of each first folded portion 31, 35.

In a case in that the second folded portion 32, 36 is provided inside the substantially U shape of the first folded portion 31, 35, that is in the folded part of the first folded portion 31, 35, the second folded portion 32, 36 is provided in a space that is generated when the first folded portion 31, 35 is formed. Therefore, a new different space for forming the second folded portion 32, 36 is not necessary to be prepared, and this enables the outer rims 21 to be reinforced without hindering decrease in the thickness of the backlight device 12.

Further, in the present embodiment, the long-side first folded portion 31 and the long-side second folded portion 32 are formed at the long-side outer rim 21b of the chassis 14.

The distortion of the chassis 14 is easier to be caused along its long-side direction. The double folding configuration comprising the long-side first folded portion 31 and the long-side second folded portion 32 is formed at the long-side outer rim 21b extending along the long-side direction of the chassis 14, and therefore, the distortion of the chassis 14 is appropriately suppressed.

Especially, in the present embodiment, the short-side first folded portion 35 and the short-side second folded portion 36 are formed also at the short-side outer rim 21a of the chassis 14.

Thus, the double folding configuration comprising the short-side first folded portion 35 and the short-side second folded portion 36 is formed at the short-side outer rim 21a of the chassis 14. This further improves the strength of the whole chassis 14 and surely suppresses the distortion of the chassis 14.

In the present embodiment, the distance between the cold cathode tubes 17 and the bottom plate 14a of the chassis 14 is quite small, for example, 0.8 mm.

Slight leakage is occurred from the cold cathode tubes 17 to the chassis 14 and the leakage amount is inversely proportional to the distance between the cold cathode tubes 17 and the chassis 14. Therefore, if the distortion is caused in the chassis 14 and the distance between each cold cathode tube 17 and the bottom plate 14a is different, the leakage amount is varied with each cold cathode tube 17. In the present embodiment, the distance between the cold cathode tubes 17 and the bottom plate 14a of the chassis 14 is set to be 0.8 mm. If the distance between the cold cathode tubes 17 and the bottom plate 14a is quite small, for example, 2.5 mm or less, the distance change amount between the two components due to the distortion of the chassis 14 with respect to the design distance between the two components is great. This increases variation of current flowing in the cold cathode tubes 17 and therefore, brightness of the cold cathode tubes 17 may be different in each cold cathode tube 17.

However, the use of the chassis 14 having the outer rims 21 of the double folding configuration according to the present invention suppresses the distortion of the chassis 14. Therefore, the configuration of the present invention provides effects especially in the thin backlight device 12, that is, in a case in that the distance between the cold cathode tubes 17 and the bottom plate 14a of the chassis 14 is small.

<Modifications>

The first embodiment of the present invention has been explained, and the configurations of the long-side first folded portion 31 and the long-side second folded portion 32 are not limited to those described therein and the following configurations are included in the present invention.

Figure 7:
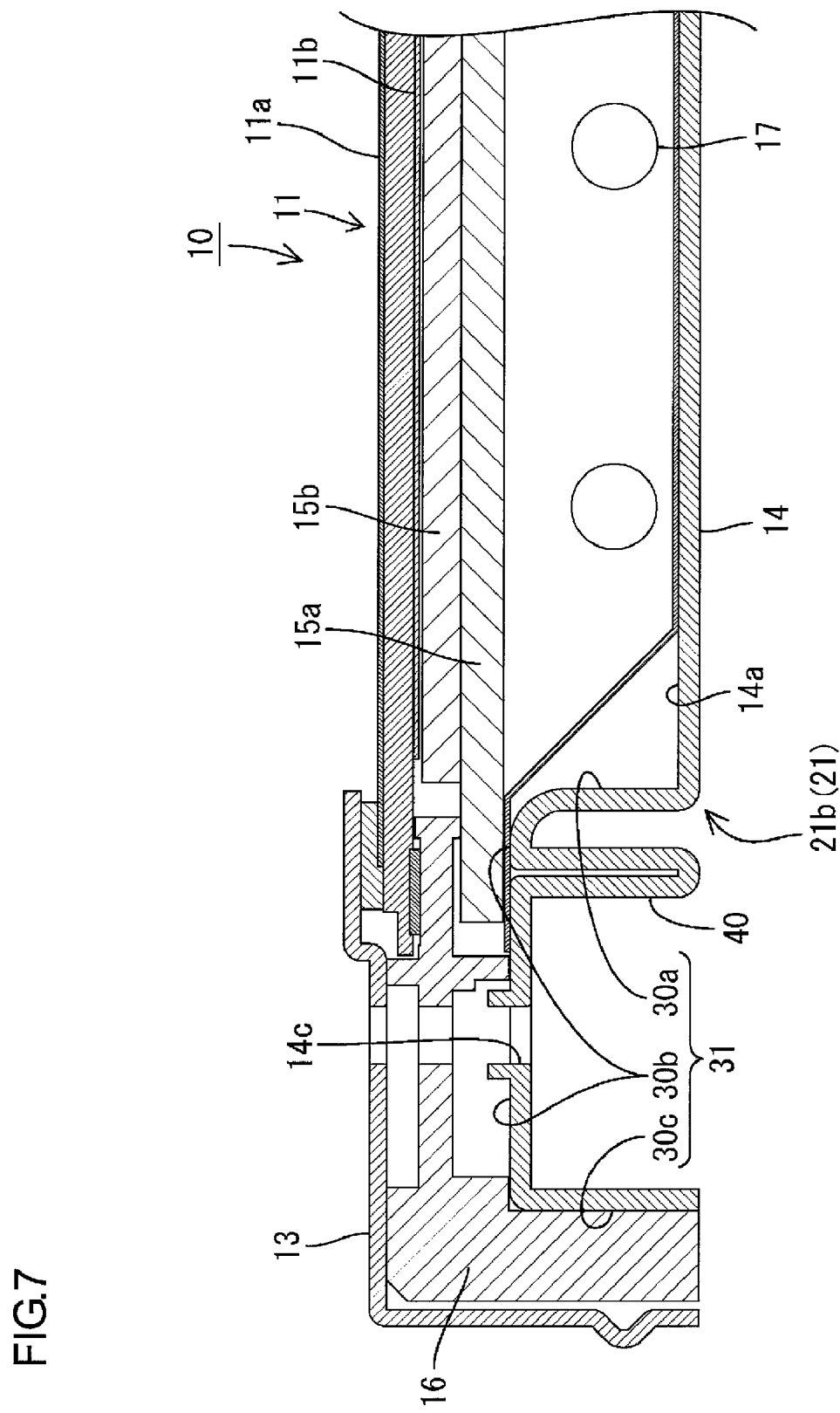
FIG. 7 is a cross-sectional view illustrating one modified example of a long-side second folded portion provided at a long-side outer rim of the liquid crystal display device in FIG. 3.

For example, as illustrated in FIG. 7, at the long-side outer rim 21b, a long-side second folded portion 40 may be formed by folding a part of the first upper plate portion 30b of the long-side first folded portion 31 in a substantially U shape at a position closer to the first inner plate portion 30a. The long-side second folded portion 40 is formed by projecting from the first upper plate portion 30b so as to overlap the first inner plate portion 30a. The long-side second folded portion 40 is formed in the folded part of the long-side first folded portion 31 so as to be closer to the first inner plate portion 30a (closer to the bottom plate 14a of the chassis 14). In this case, the long-side first folded portion 31 forms an outer appearance of the long-side outer rim 21b, and the long-side second folded portion 40 is formed by folding a part of the first upper plate portion 30b of the long-side first folded portion 31 and provided in the long-side first folded portion 31 so as to overlap the first inner plate portion 30a.

Figure 8:
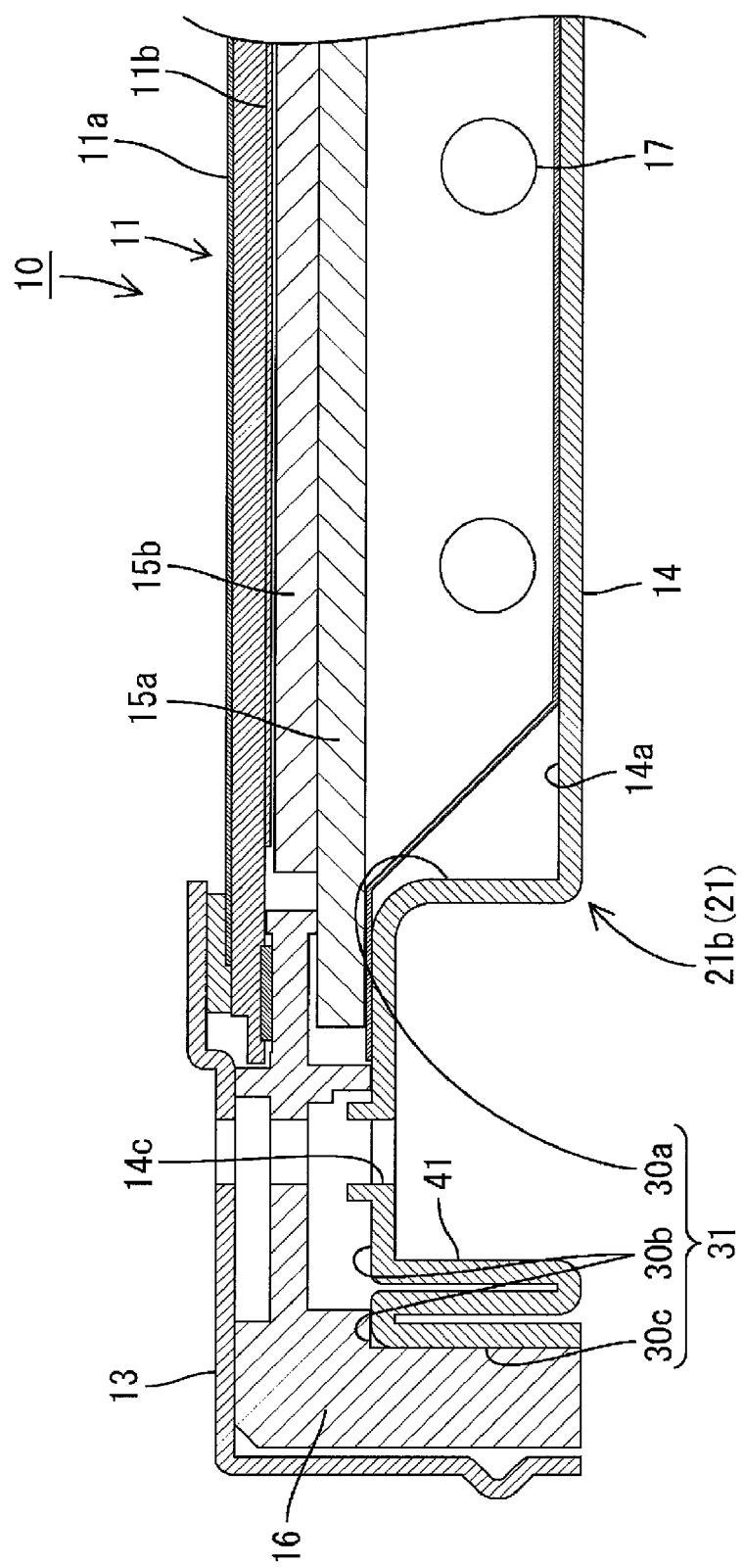
FIG. 8 is a cross-sectional view illustrating an additional modified example of the long-side second folded portion.

As illustrated in FIG. 8, at the long-side outer rim 21b, a long-side second folded portion 41 may be formed by folding a part of the first upper plate portion 30b of the long-side first folded portion 31 in a substantially U shape at a position closer to the first outer plate portion 30c. The long-side second folded portion 41 is projected from the upper plate portion 30b so as to overlap the first outer plate portion 30c. The long-side second folded portion 41 is formed in the folded part of the long-side first folded portion 31 so as to be closer to the first outer plate portion 30c (far away from the bottom plate 14a of the chassis 14). In this case, the long-side first folded portion 31 forms an outer appearance of the long-side outer rim 21b, and the long-side second folded portion 41 is formed by folding a part of the first upper plate portion 30b of the long-side first folded portion 31 and provided in the long-side first folded portion 31 so as to overlap the first outer plate portion 30c.

Figure 9:
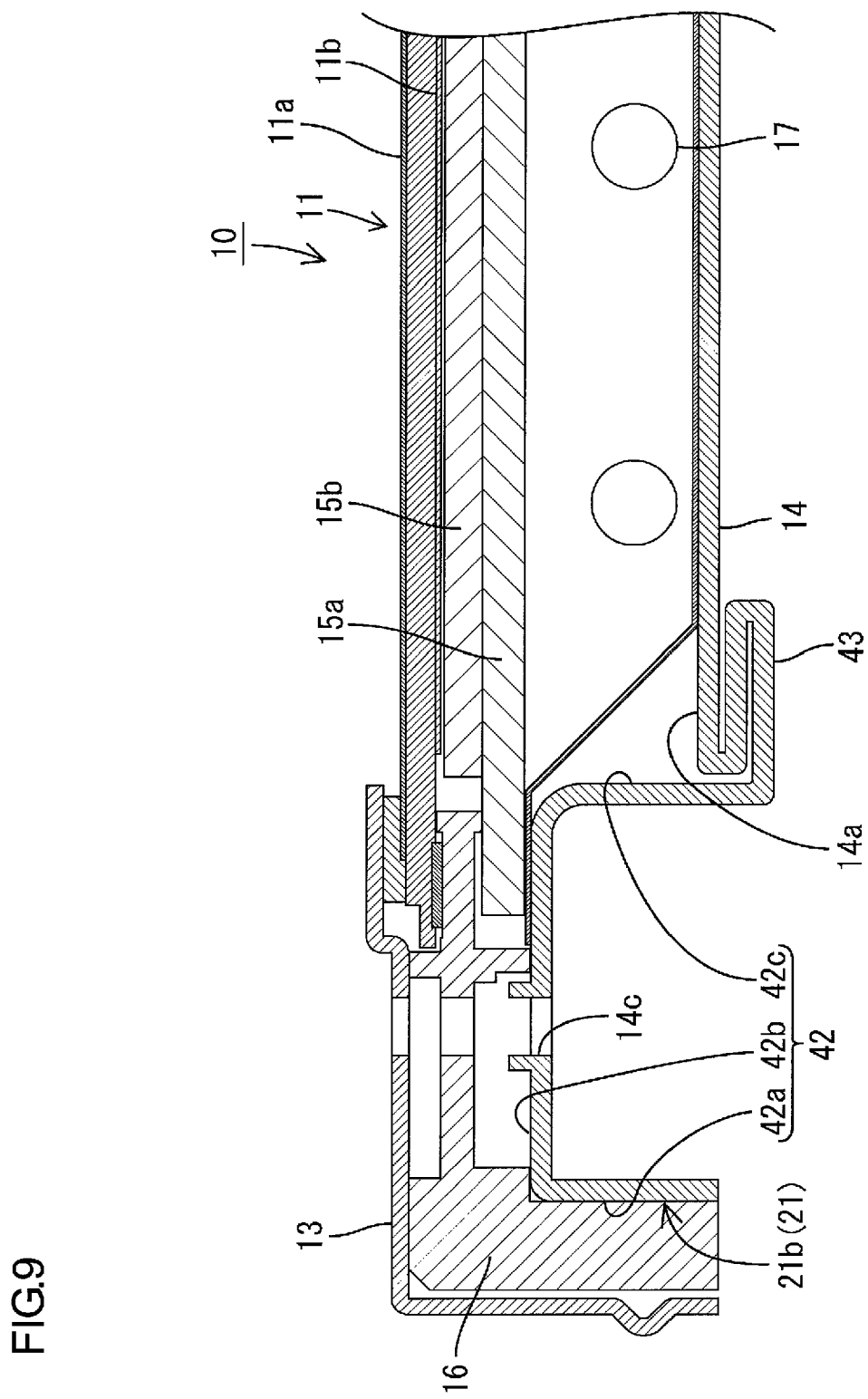
FIG. 9 is a cross-sectional view illustrating an additional modified example of a long-side first folded portion and the long-side second folded portion.

Further, as illustrated in FIG. 9, a long-side first folded portion 42 and a long-side second folded portion 43 may be provided at the long-side outer rim 21b. The long-side first folded portion 42 includes an outer plate portion 42a, an upper plate portion 42b and an inner plate portion 42c. The long-side second folded portion 43 is folded from a distal end of the inner plate portion 42c of the long-side first folded portion 42 in a substantially U shape and projected from the inner plate portion 42c so as to overlap the bottom plate 14a of the chassis 14. In this case, the long-side second folded portion 43 and the long-side first folded portion 42 are circumscribed. The long-side first folded portion 42 forms an outer appearance of the long-side outer rim 21b and the long-side second folded portion 43 is provided adjacent to an outer edge of a rear surface of the bottom plate 14a of the chassis 14.

The configurations of the short-side first folded portion 35 and the short-side second folded portion 36 are not limited to those described in the first embodiment, and the following configurations are included in the present invention.

Figure 10:
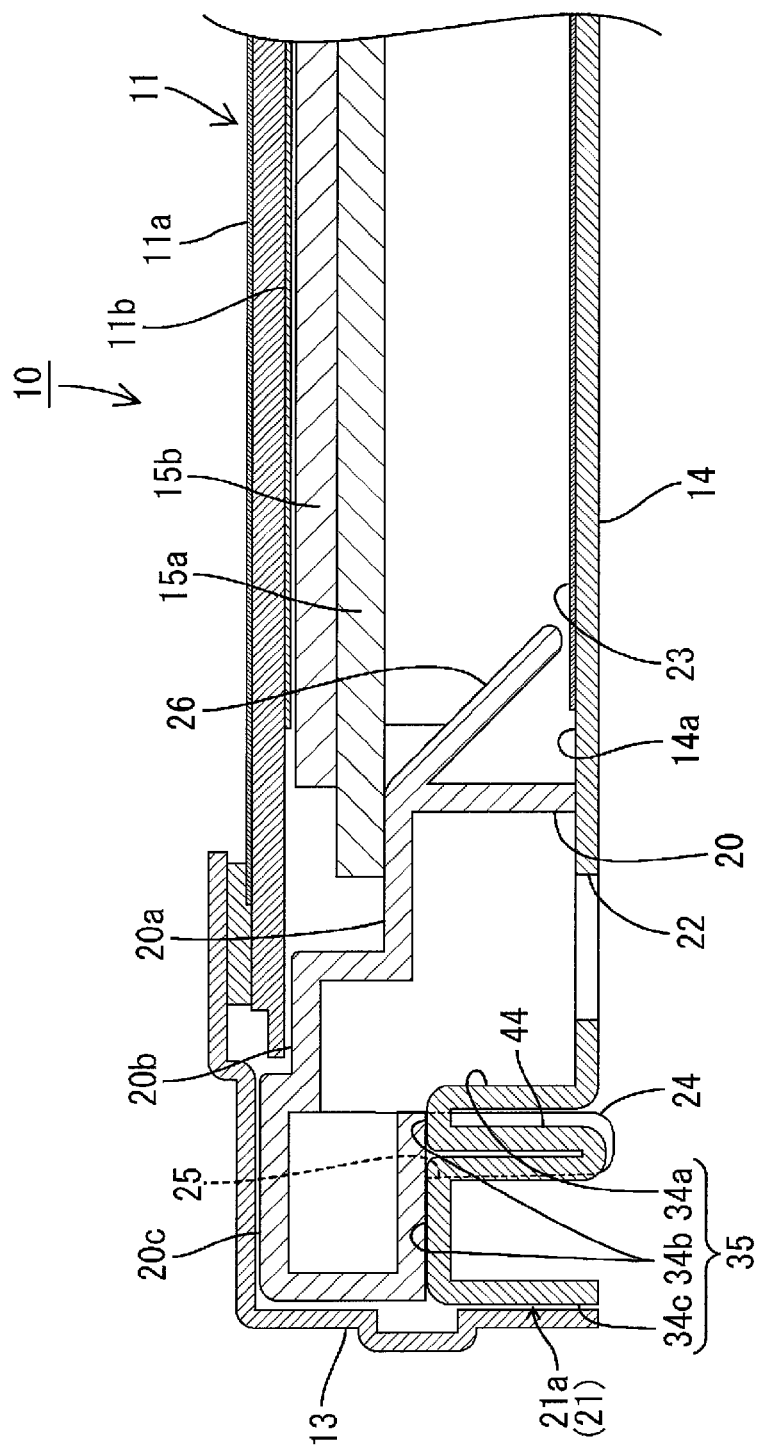
FIG. 10 is a cross-sectional view illustrating one modified example of a short-side second folded portion provided at a short-side outer rim of the liquid crystal display device in FIG. 4.

For example, as illustrated in FIG. 10, at the short-side outer rim 21a, a short-side second folded portion 44 may be formed by folding a part of the third upper plate portion 34b of the short-side first folded portion 35 in a substantially U shape at a position closer to the third inner plate portion 34a. The short-side second folded portion 44 is projected from the third upper plate portion 34b so as to overlap the third inner plate portion 34a and formed in the folded part of the short-side first folded portion 35 so as to be closer to the third inner plate portion 34a (closer to the bottom plate 14a of the chassis 14). In this case, the short-side first folded portion 35 forms an outer appearance of the short-side outer rim 21a. The short-side second folded portion 44 is formed by folding a part of the third upper plate portion 34b of the short-side first folded portion 35 and provided in the short-side first folded portion 35 so as to overlap the third inner plate portion 34a.

Figure 11:
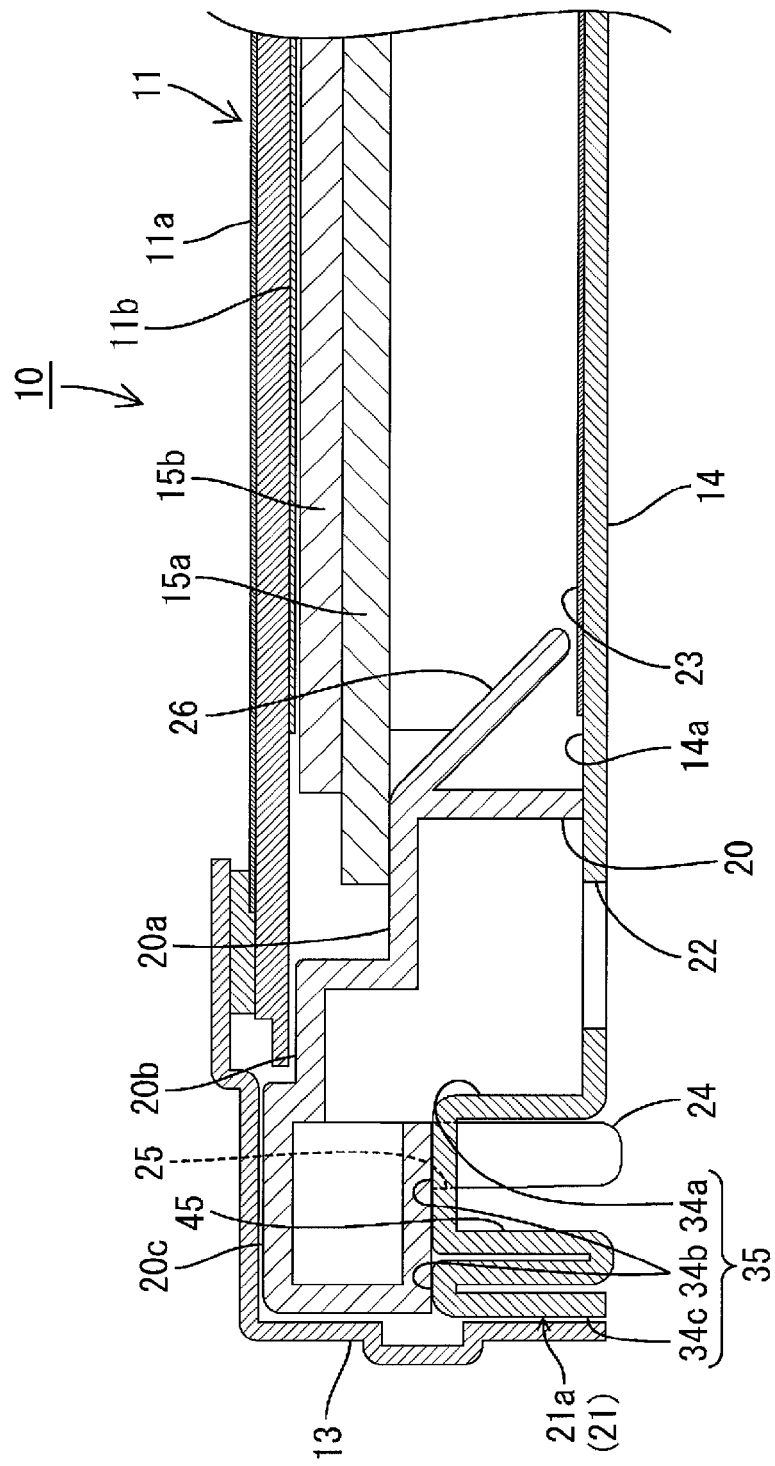
FIG. 11 is a cross-sectional view illustrating another modified example of the short-side second folded portion.

As illustrated in FIG. 11, at the short-side outer rim 21a, a short-side second folded portion 45 may be formed by folding a part of the third upper plate portion 34b of the short-side first folded portion 35 in a substantially U shape at a position closer to the third outer plate portion 34c. The short-side second folded portion 45 is projected from the third upper plate portion 34b so as to overlap the third outer plate portion 34c and formed in the folded part of the short-side first folded portion 35 so as to be closer to the third outer plate portion 34c (far away from the bottom plate 14a of the chassis 14). In this case, the short-side first folded portion 35 forms an outer appearance of the short-side outer rim 21a. The short-side second folded portion 45 is formed by folding a part of the third upper plate portion 34b of the short-side first folded portion 35 and provided in the short-side first folded portion 35 so as to overlap the third outer plate portion 34c.

Figure 12:
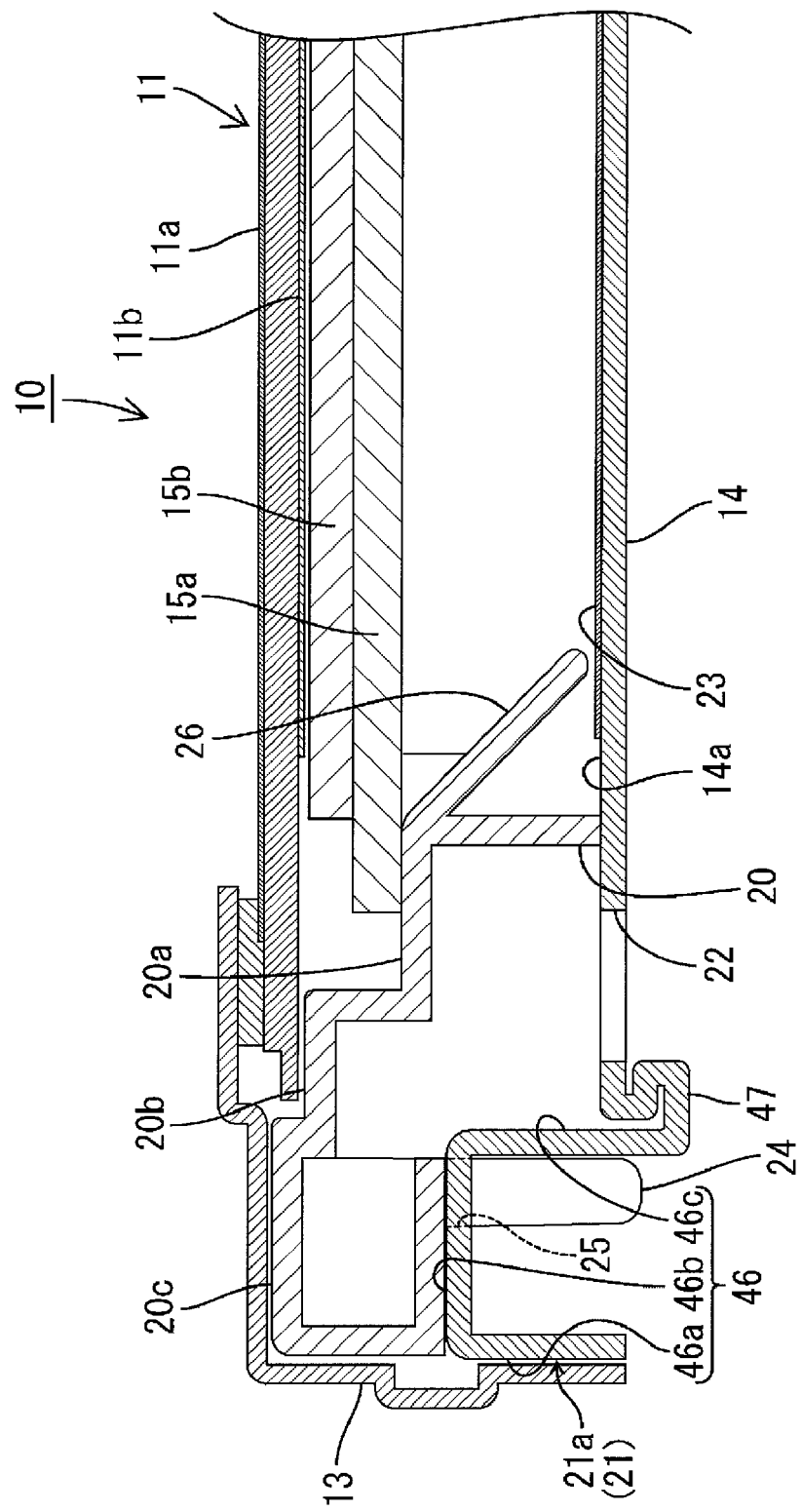
FIG. 12 is a cross-sectional view illustrating an additional modified example of a short-side first folded portion and the short-side second folded portion.

Further, as illustrated in FIG. 12, a short-side first folded portion 46 and a short-side second folded portion 47 may be provided at the short-side outer rim 21a. The short-side first folded portion 46 includes an outer plate portion 46a, an upper plate portion 46b and an inner plate portion 46c. The short-side second folded portion 47 is folded from the distal end of the inner plate portion 46c of the short-side first folded portion 46 in a substantially U shape and projected from the inner plate portion 46c so as to overlap the bottom plate 14a of the chassis 14. In this case, the short-side second folded portion 47 and the short-side first folded portion 46 are circumscribed. The short-side first folded portion 46 forms an outer appearance of the short-side outer rim 21a and the short-side second folded portion 47 is provided adjacent to the outer edge of the rear surface of the bottom plate 14a of the chassis 14.

<Second Embodiment>

Next, a second embodiment of the present invention will be explained with reference to FIGS. 13 to 15. In the second embodiment, a reinforcing plate is provided in the folded part of the outer rim, and other configurations are same as the above embodiment. The same parts as the above embodiment are indicated by the same symbols and the explanation thereof is omitted.

Figure 13:
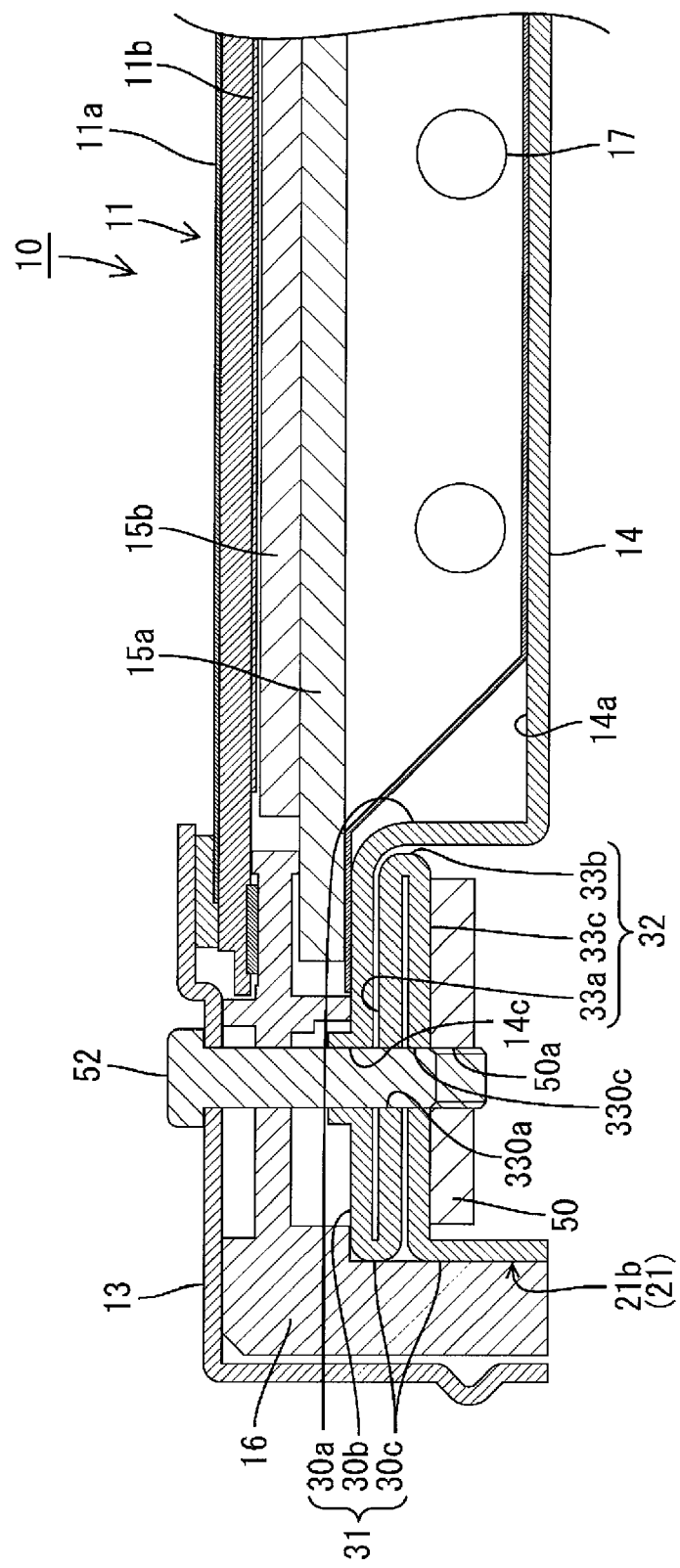
FIG. 13 is a cross-sectional view illustrating a cross-sectional configuration along a short-side direction of the liquid crystal display device according to a second embodiment of the present invention.

FIG. 13 is an enlarged cross-sectional view illustrating a cross-sectional configuration of a main portion along a short-side direction of the liquid crystal display device according to the second embodiment. FIG. 14 is an enlarged cross-sectional view illustrating a cross-sectional configuration of a main portion along a long-side direction of the liquid crystal display device. FIG. 15 is a perspective view illustrating a configuration of a reinforcing plate attached to the folded outer rim in the liquid crystal display.

The chassis 14 is formed in a substantially shallow box shape with plating. It includes a flat bottom plate 14a and outer rims 21 (the short-side outer rims 21a in the short-side direction and the long-side outer rims 21b in the long-side direction), each of which extends upright from the corresponding side of the bottom plate 14a and is formed in a substantially U shape.

The long-side outer rim 21b of the chassis 14 includes a long-side first folded portion 31 and a long-side second folded portion 32, as illustrated in FIG. 13. The long-side first folded portion 31 includes three plate portions 30a, 30b, 30c. The long-side second folded portion 32 is folded from the first outer plate portion 30c in a substantially U shape in the long-side first folded portion 31. Screw holes 330a, 330c are formed in the corresponding portions of the second upper plate portion 33a and the second lower plate portion 33c of the long-side second folded portion 32 so as to overlap the fixing holes 14c. In the second embodiment, the long-side first folded portion 31 forms an outer appearance of the long-side outer rim 21b. The long-side second folded portion 32 is formed by folding a part of the first outer plate portion 30c of the long-side first folded portion 31 and provided in the long-side first folded portion 31 so as to overlap the first upper plate portion 30b.

Further, a reinforcing plate (core member) 50 is attached to the second lower plate portion 33c of the long-side second folded portion 32. The reinforcing plate 50 is made of galvanized steel and formed in an elongated plate, as illustrated in FIG. 15. A plurality of fixing holes 50a for fixing the reinforcing plate are formed in the reinforcing plate 50 so as to penetrate through a thickness of the reinforcing plate 50. Other than galvanized steel, the material of the reinforcing plate 50 may be appropriately selected from iron alloy having corrosion resistance or stainless and others.

The reinforcing plate 50 is provided inside the folded part of the long-side first folded portion 31, that is, in the folded part. An upper surface of the reinforcing plate 50 is contacted to a lower surface of the second lower plate portion 33c of the long-side second folded portion 32 with a plane surface contact. A small gap is formed between each of two longitudinal side surfaces of the reinforcing plate 50 and each of the first inner plate portion 30a and the first outer plate portion 30c of the long-side first folded portion 31, respectively. The reinforcing plate 50 is attached to the long-side outer rim 21b by inserting a screw (fixing member) 52 from the outside of the bezel 13 through the frame 16, the fixing hole 14c in the long-side outer rim 21b and the screw holes 330a, 330c in this order to be screwed into the fixing hole 50a in the reinforcing plate 50.

Figure 14:
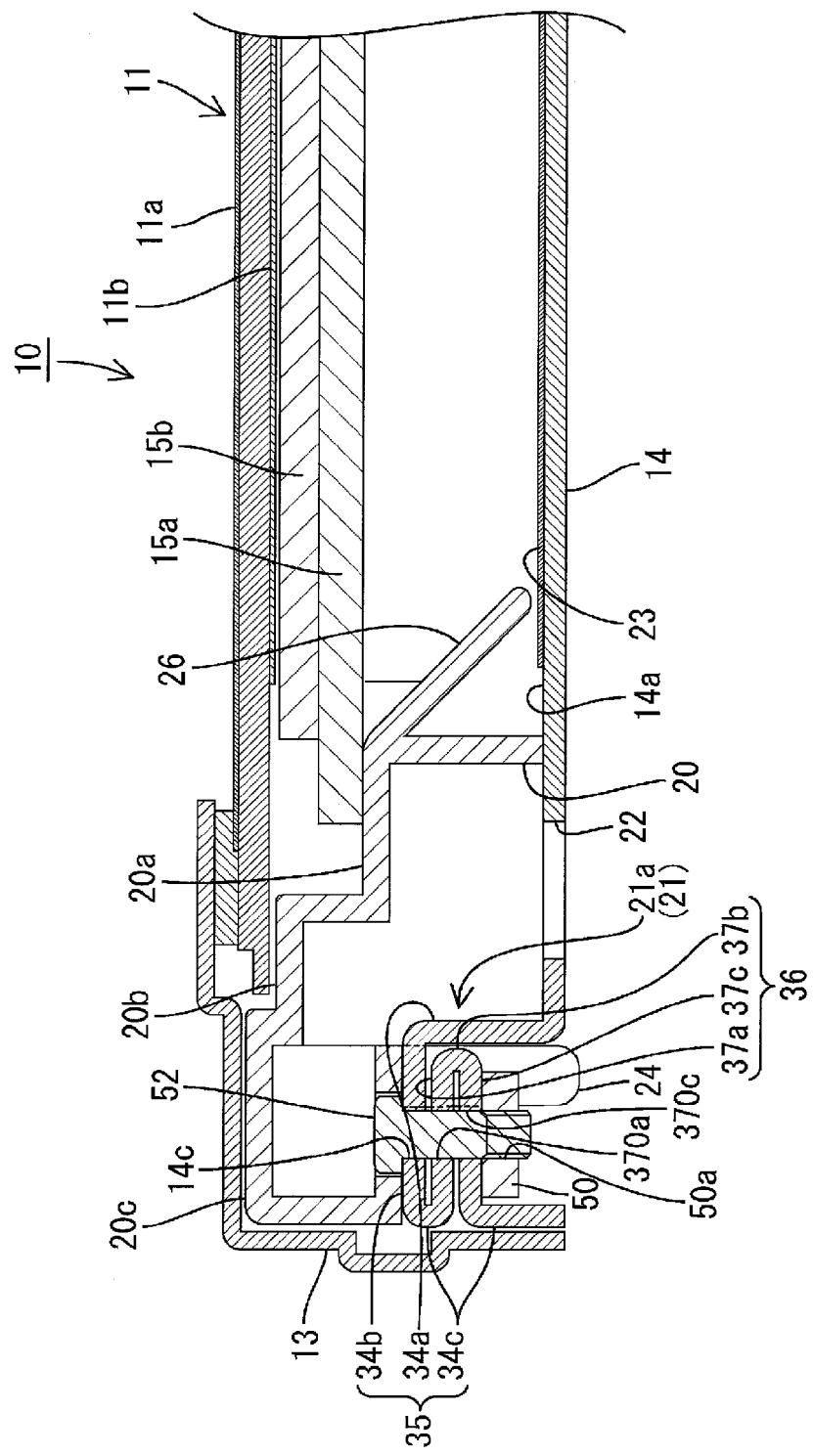
FIG. 14 is a cross-sectional view illustrating a cross-sectional configuration along a long-side direction of the liquid crystal display device.
Figure 15:
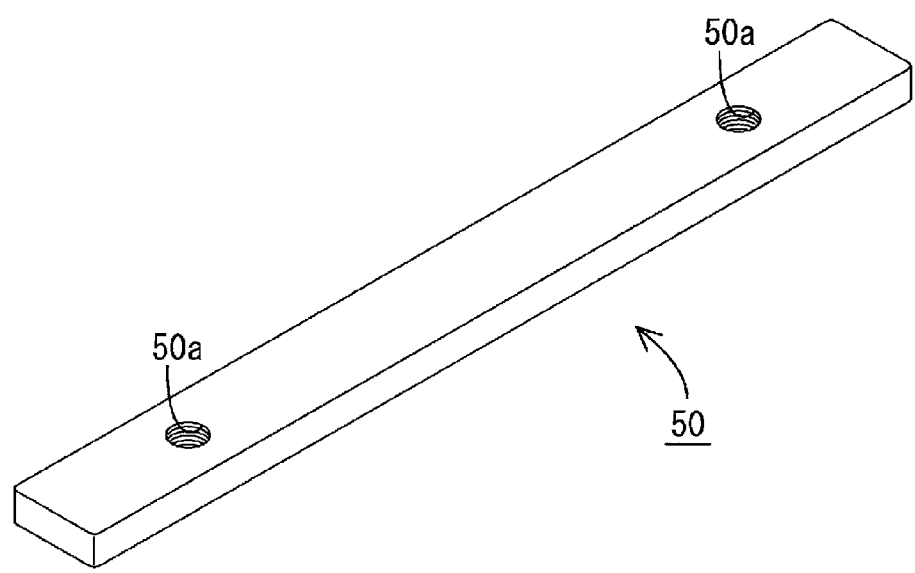
FIG. 15 is a perspective view illustrating a configuration of a reinforcing plate attached to the outer rim of the chassis provided in the liquid crystal display device in FIG. 13.

The short-side outer rim 21a of the chassis 14 has a short-side first folded portion 35 and a short-side second folded portion 36 in the short-side first folded portion 35, as illustrated in FIG. 14. The short-side first folded portion 35 includes three plate portions 34a, 34b, 34c. The short-side second folded portion 36 is folded in a substantially U shape. A fixing hole 14c is provided in the third upper plate portion 34b of the short-side first folded portion 35. Screw holes 370a, 370c are formed in the fourth upper plate portion 37a and the fourth lower plate portion 37c of the short-side second folded portion 36 so as to overlap the fixing hole 14c. In the second embodiment, the short-side first folded portion 35 forms an outer appearance of the short-side outer rim 21a. The short-side second folded portion 36 is formed by folding a part of the third outer plate portion 34c of the short-side first folded portion 35 and provided in the short-side first folded portion 35 so as to overlap the third upper plate portion 34b.

Further, the reinforcing plate 50 is attached to the fourth lower plate portion 37c of the short-side second folded portion 36. The reinforcing plate 50 is provided inside the folded part of the short-side first folded portion 35, that is, in the folded part. An upper surface of the reinforcing plate 50 is contacted to a lower surface of the fourth lower plate portion 37c of the short-side second folded portion 36 with a plane surface contact. A small gap is formed between each of two longitudinal side surfaces of the reinforcing plate 50 and each of the third inner plate portion 34a and the third outer plate portion 34c of the short-side first folded portion 35, respectively. The reinforcing plate 50 is attached to the short-side outer rim 21a by inserting the screw 52 from the outside of the short-side first folded portion 35 through the fixing hole 14c and the screw holes 370a, 370c in this order to be screwed into the fixing hole 50a in the reinforcing plate 50.

The backlight device 12 of the second embodiment having the above-described configuration has following operational effects.

The chassis 14 provided in the backlight device 12 according to the second embodiment has the outer rims 21 comprising the first folded portions 31, 35 and the second folded portions 32, 36 that are formed by folding a part of the corresponding first folded portion 31, 35. Further, the reinforcing plate 50 is attached to the chassis 14 inside the folded part of the first folded portion 31, 35 of the outer rim 21 so as to be contacted to the second folded portion 32, 36.

Thus, the reinforcing plate 50 is further attached to the outer rim 21 having the double folding configuration. This further improves strength of the outer rims 21 and suppresses the distortion of the chassis 14 more surely.

Further, the reinforcing plate 50 is provided inside the folded part of the first folded portion 31, 35, that is, in the folded part. Therefore, a new different space for arranging the reinforcing plate 50 is not necessary to be prepared, and decrease in the thickness of the backlight device 12 is not hindered.

In the second embodiment, the reinforcing plate 50 is fixed to the outer rim 21 by the screw 52 that is inserted through the reinforcing plate 50, the first folded portion 31, 35 and the second folded portion 32, 36.

In this case, a complicated process for fixing the reinforcing plate 50 to the outer rim 21 is not necessary. Reinforcement of the outer rim 21 is achieved without reducing efficiency of assembling work.

<Modifications>

The second embodiment of the present invention has been explained, and the attachment configuration of the reinforcing plate 50 is not limited thereto and the following configurations are included in the present invention.

Figure 16:
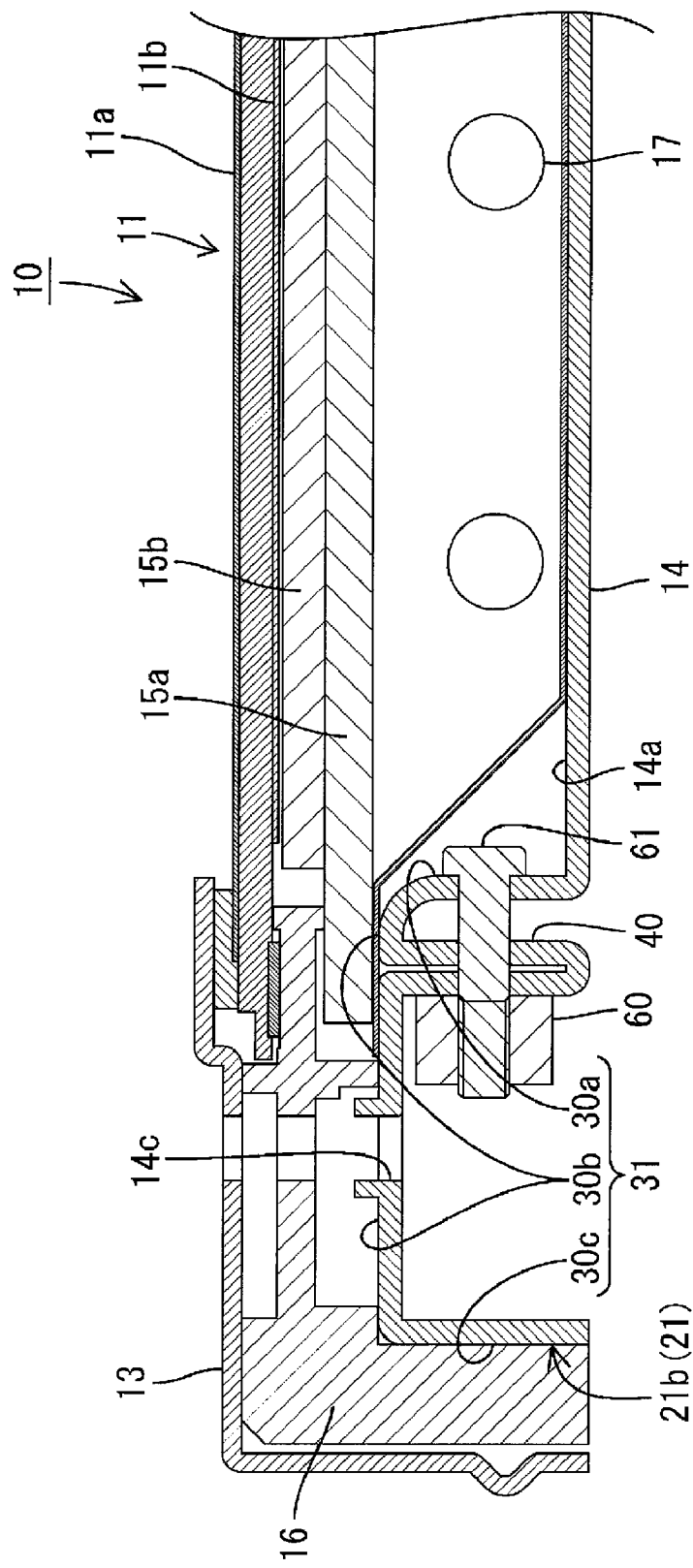
FIG. 16 is a cross-sectional view illustrating one modified example illustrating an attachment example of the reinforcing plate attached to the long-side outer rim of the liquid crystal display device in FIG. 13.

For example, as illustrated in FIG. 16, the long-side first folded portion 31 and the long-side second folded portion 40 are formed at the long-side outer rim 21b. The long-side second folded portion 40 is formed by folding the first upper plate portion 30b of the long-side first folded portion 31 in a substantially U shape. Specifically, the long-side second folded portion 40 is formed in the folded part of the long-side first folded portion 31 so as to be closer to the first inner plate portion 30a (closer to the bottom plate 14a of the chassis 14). In other words, the long-side first folded portion 31 forms an outer appearance of the long-side outer rim 21b, and the long-side second folded portion 40 is formed by folding a part of the first upper plate portion 30b of the long-side first folded portion 31 and provided in the long-side first folded portion 31 so as to overlap the first inner plate portion 30a. A reinforcing plate 60 may be arranged to be contacted to a surface of the long-side second folded portion 40 facing the first outer plate portion 30c with a plane surface contact, and the reinforcing plate 60 may be fixed to the long-side second folded portion 40 by the screw 61 that is inserted from the first inner plate portion 30a.

Figure 17:
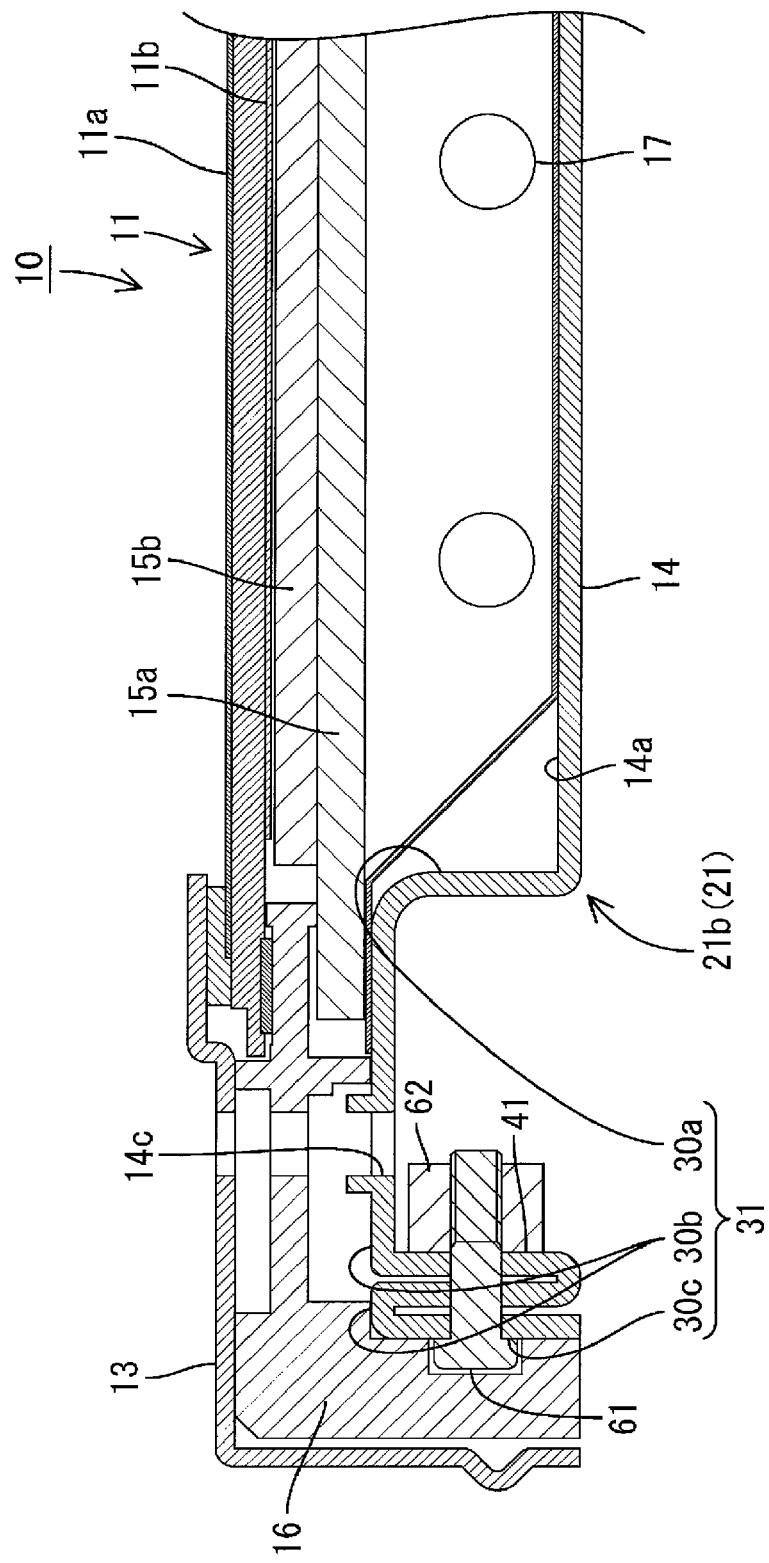
FIG. 17 is a cross-sectional view illustrating another modified example illustrating an attachment example of the reinforcing plate attached to the long-side outer rim.

Further, as illustrated in FIG. 17, the long-side first folded portion 31 and the long-side second folded portion 41 are formed at the long-side outer rim 21b. The long-side second folded portion 41 is formed by folding the first upper plate portion 30b of the long-side first folded portion 31 in a substantially U shape. Specifically, the long-side second folded portion 41 is formed in the folded part of the long-side first folded portion 31 so as to be closer to the first outer plate portion 30c (far away from the bottom plate 14a of the chassis 14). In other words, the long-side first folded portion 31 forms an outer appearance of the long-side outer rim 21b, and the long-side second folded portion 41 is formed by folding a part of the first upper plate portion 30b of the long-side first folded portion 31 and provided in the long-side first folded portion 31 so as to overlap the first outer plate portion 30c. A reinforcing plate 62 may be arranged to be contacted to a surface of the long-side second folded portion 41 facing the first inner plate portion 30a with a plane surface contact, and the reinforcing plate 62 may be fixed to the long-side second folded portion 41 by the screw 61 that is inserted from the first outer plate portion 30c.

Figure 18:
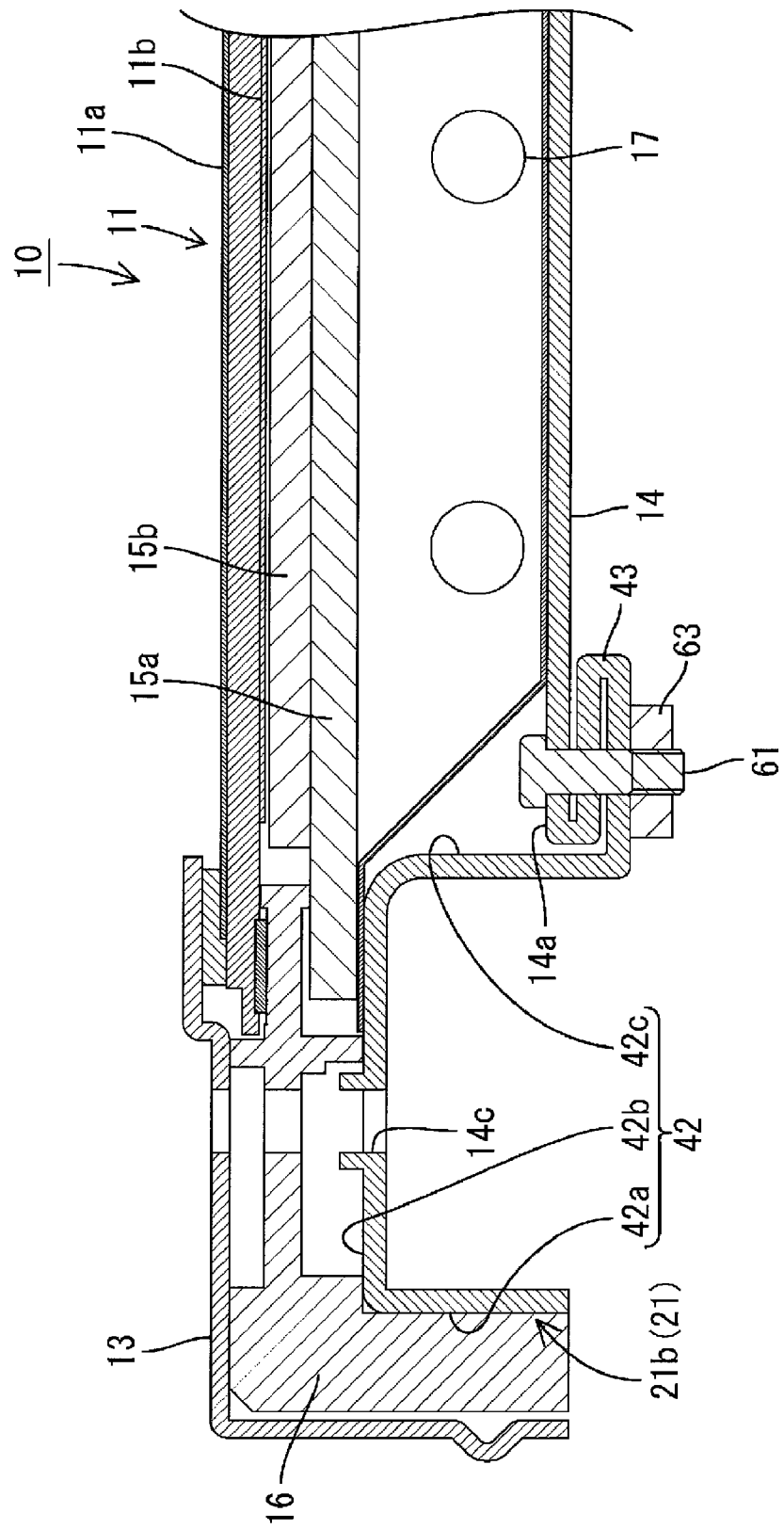
FIG. 18 is a cross-sectional view illustrating a further additional modified example illustrating an attachment example of the reinforcing plate attached to the long-side outer rim.

Further, as illustrated in FIG. 18, the long-side first folded portion 42 and the long-side second folded portion 43 are formed at the long-side outer rim 21b. The long-side second folded portion 43 is formed by folding the end of the inner plate portion 42c of the long-side first folded portion 32 in a substantially U shape and projected from the inner plate portion 42c so as to overlap the bottom plate 14a of the chassis 14. In other words, the long-side second folded portion 43 and the long-side first folded portion 42 are circumscribed. The long-side first folded portion 42 forms an outer appearance of the long-side outer rim 21b, and the long-side second folded portion 43 is arranged adjacent to the outer edge of the rear surface of the bottom plate 14a of the chassis 14. A reinforcing plate 63 may be attached to the rear surface of the bottom plate 14a in a state in that the reinforcing plate 63 is contacted to a surface of the long-side second folded portion 43 substantially parallel to the bottom plate 14a with a plane surface contact. The reinforcing plate 63 may be fixed to the long-side second folded portion 43 by the screw 61 that is inserted from the bottom plate 14a.

Figure 19:
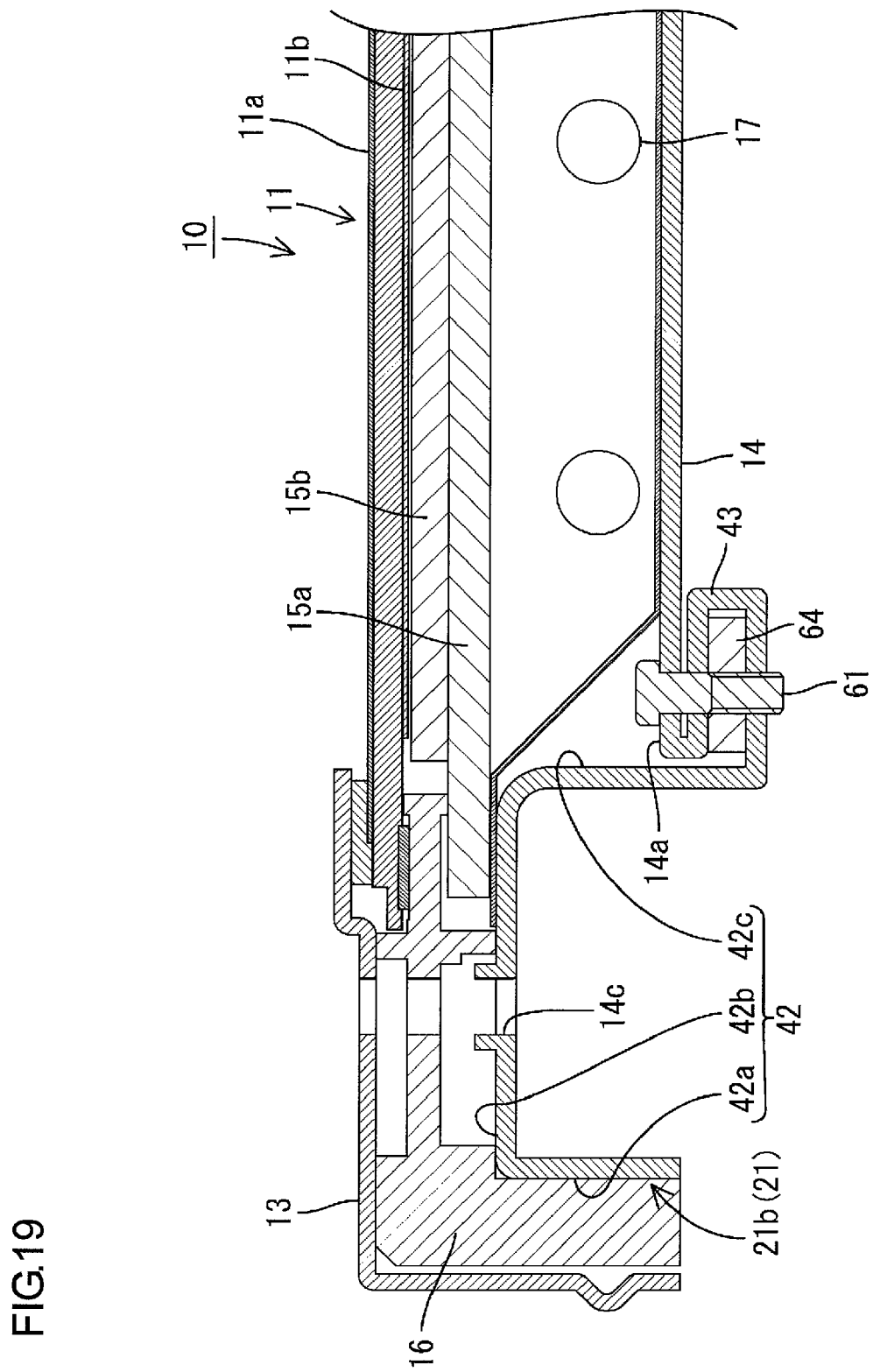
FIG. 19 is a cross-sectional view illustrating a further additional modified example illustrating an attachment example of the reinforcing plate attached to the long-side outer rim.

As illustrated in FIG. 19, a reinforcing plate 64 may be provided inside the folded part of the long-side second folded portion 43, that is, in the folded part, and may be fixed to the long-side second folded portion 43 by the screw 61 that is inserted from the bottom plate 14a.

Figure 20:
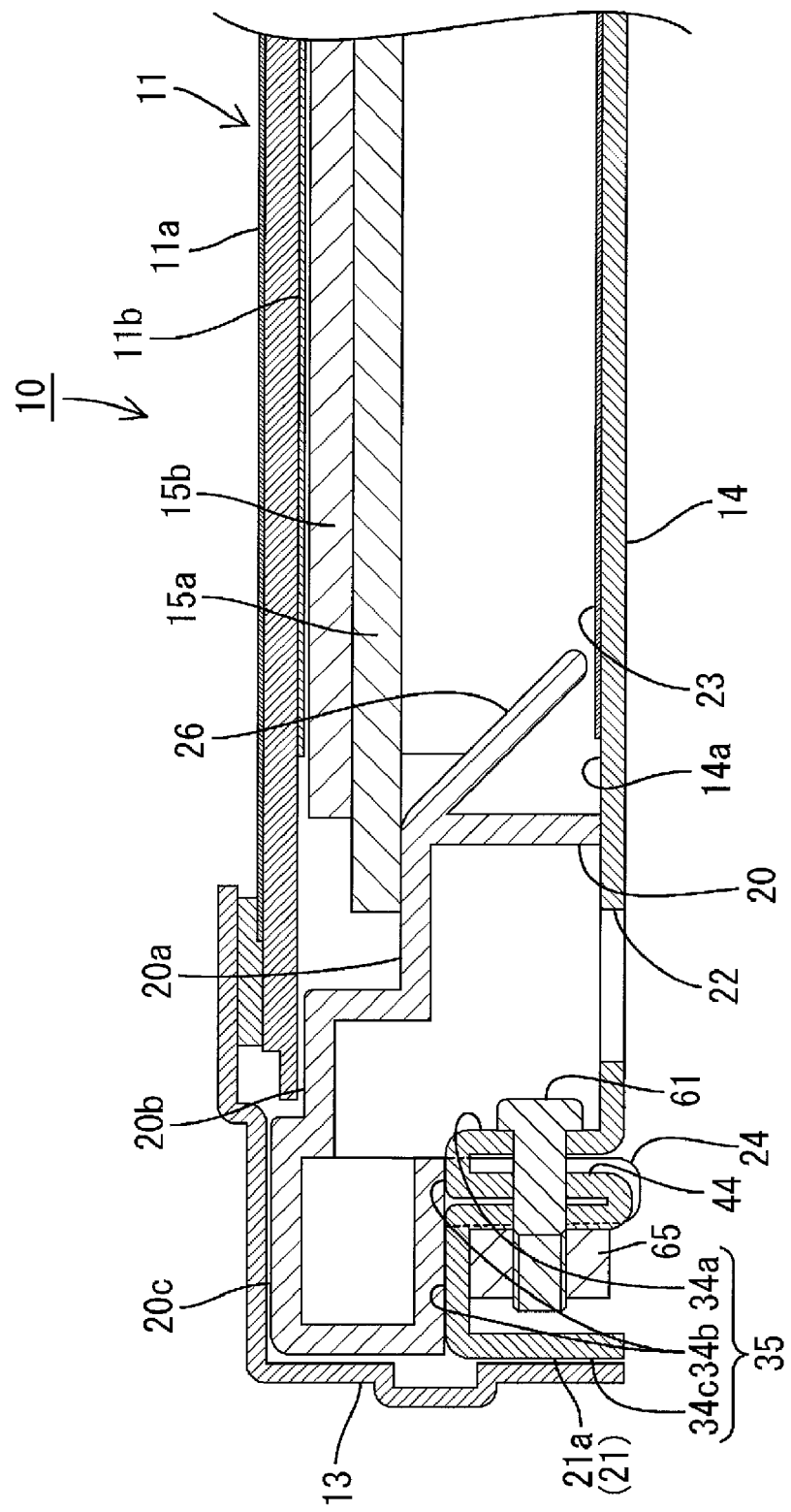
FIG. 20 is a cross-sectional view illustrating one modified example illustrating an attachment example of the reinforcing plate attached to a short-side outer rim of the liquid crystal display device in FIG. 14.

As illustrated in FIG. 20, the short-side first folded portion 35 and the short-side second folded portion 44 are formed at the short-side outer rim 21a. The short-side second folded portion 44 is formed by folding the third upper plate portion 34b of the short-side first folded portion 35 in a substantially U shape. Specifically, the short-side second folded portion 44 is formed in the folded part of the short-side first folded portion 35 so as to be closer to the third inner plate portion 34a. In other words, the short-side first folded portion 35 forms an outer appearance of the short-side outer rim 21a, and the short-side second folded portion 44 is formed by folding a part of the third upper plate portion 34b of the short-side first folded portion 35 and provided in the short-side first folded portion 35 so as to overlap the third inner plate portion 34a. A reinforcing plate 65 may be arranged to be contacted to a surface of the short-side second folded portion 44 facing the third outer plate portion 34c with a plane surface contact, and the reinforcing plate 65 may be fixed to the short-side second folded portion 44 by the screw 61 that is inserted from the third inner plate portion 34a.

Figure 21:
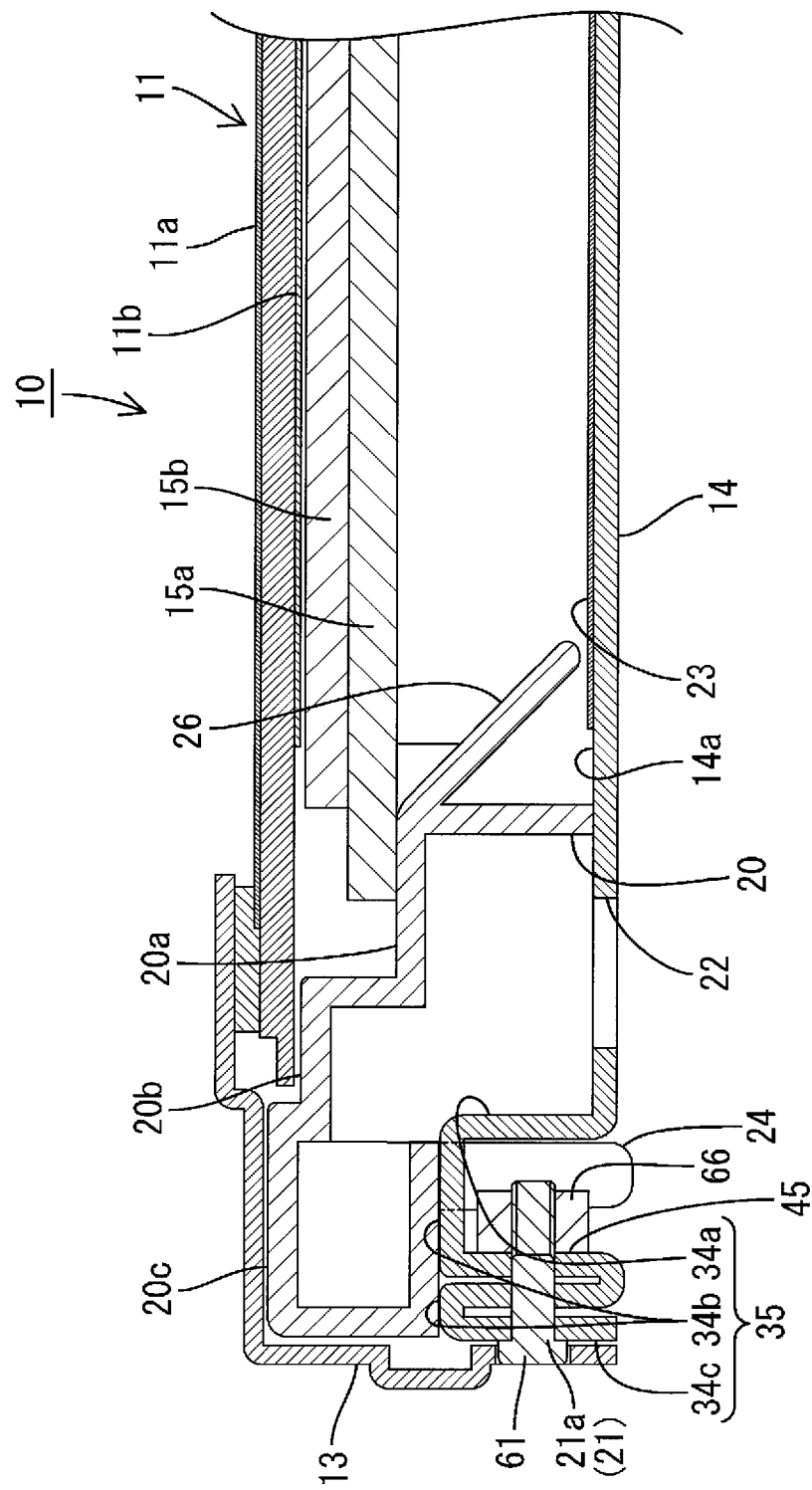
FIG. 21 is a cross-sectional view illustrating another modified example illustrating an attachment example of the reinforcing plate attached to the short-side outer rim.

As illustrated in FIG. 21, the short-side first folded portion 35 and the short-side second forded portion 45 are formed at the short-side outer rim 21a. The short-side second folded portion 45 is formed by folding a part of the third upper plate portion 34b of the short-side first folded portion 35 in a substantially U shape. Specifically, the short-side second folded portion 45 is formed in the folded part of the short-side first folded portion 35 so as to be closer to the third outer plate portion 34c. In other words, the short-side first folded portion 35 forms an outer appearance of the short-side outer rim 21a, and the short-side second folded portion 45 is formed by folding a part of the third upper plate portion 34b of the short-side first folded portion 35 and provided in the short-side first folded portion 35 so as to overlap the third outer plate portion 34c. A reinforcing plate 66 maybe arranged to be contacted to a surface of the short-side second folded portion 45 facing the third inner plate portion 34a with a plane surface contact, and the reinforcing plate 66 may be fixed to the short-side second folded portion 45 by the screw 61 that is inserted from the third outer plate portion 34c.

Figure 22:
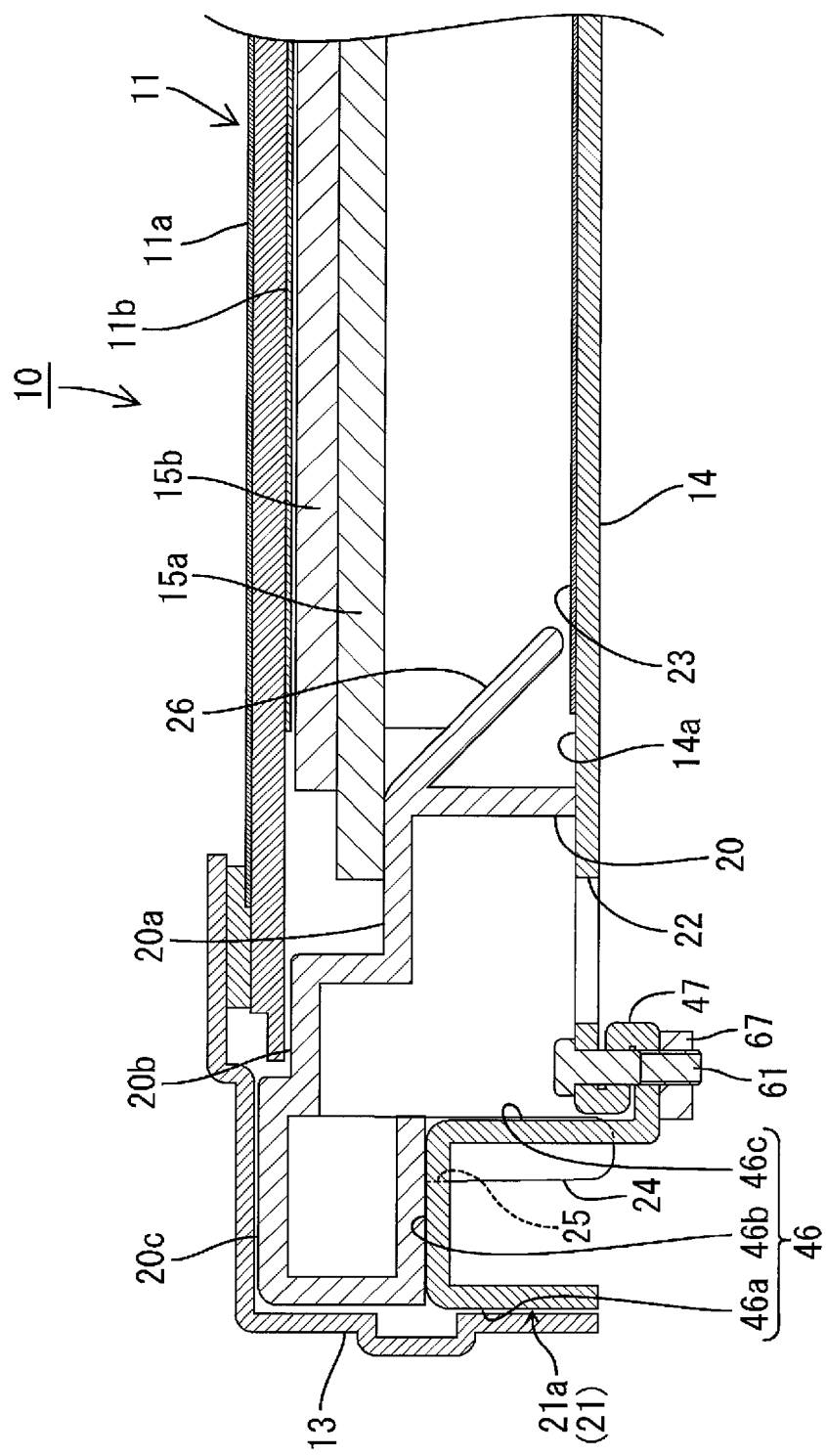
FIG. 22 is a cross-sectional view illustrating an additional modified example illustrating an attachment example of the reinforcing plate attached to the short-side outer rim.

Further, as illustrated in FIG. 22, the short-side first folded portion 46 and the short-side second forded portion 47 are formed at the short-side outer rim 21a. The short-side second folded portion 47 is formed by folding an end of the inner plate portion 46c of the short-side first folded portion 46 in a substantially U shape and projected from the inner plate portion 46c so as to overlap the bottom plate 14a of the chassis 14. In other words, the short-side second folded portion 47 and the short-side first folded portion 42 are circumscribed. The short-side first folded portion 46 forms an outer appearance of the short-side outer rim 21a, and the short-side second folded portion 47 is arranged adjacent to the outer edge of the rear surface of the bottom plate 14a of the chassis 14. A reinforcing plate 63 may be attached to the rear surface of the bottom plate 14a in a state in that the reinforcing plate 63 is contacted to a surface of the short-side second folded portion 47 substantially parallel to the bottom plate 14a with a plane surface contact. The reinforcing plate 63 may be fixed to the short-side second folded portion 47 by the screw 61 that is inserted from the bottom plate 14a.

Figure 23:
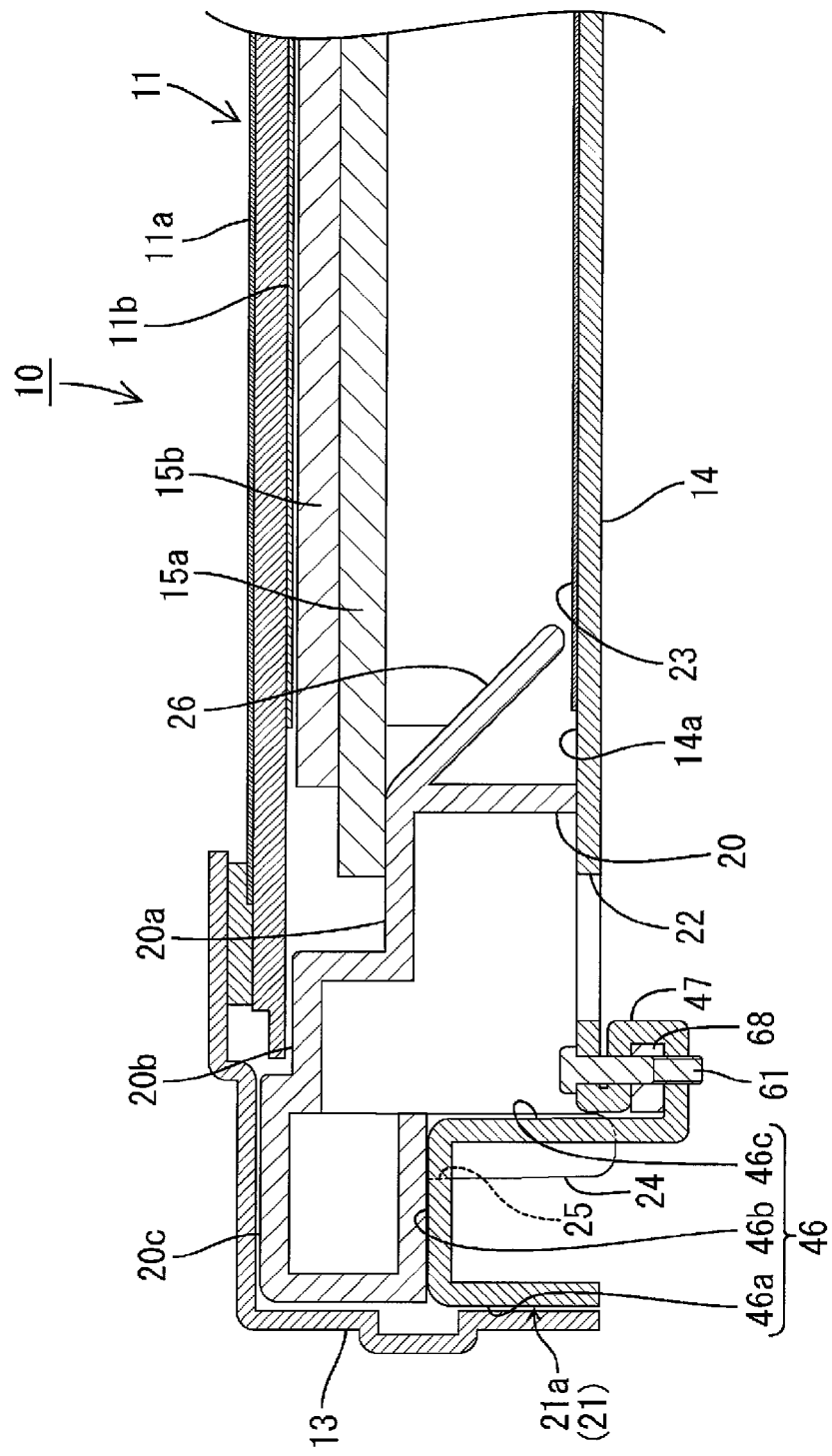
FIG. 23 is a cross-sectional view illustrating an additional modified example illustrating an attachment example of the reinforcing plate attached to the short-side outer rim.
Figure 24:
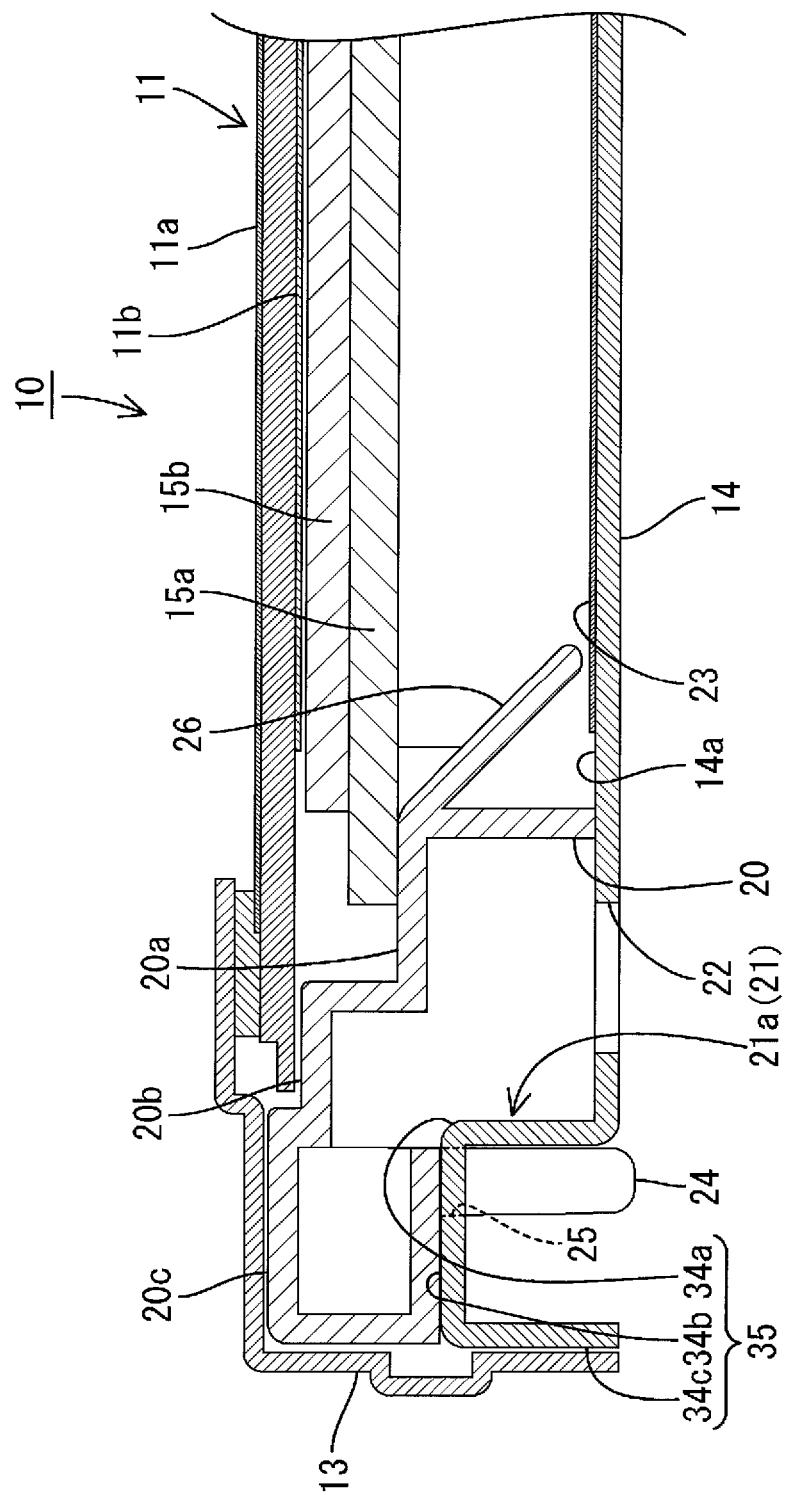
FIG. 24 is a cross-sectional view illustrating one modified example of the short-side outer rim.

As illustrated in FIG. 23, a reinforcing plate 68 may be provided inside the folded part of the short-side second folded portion 47, that is, in the folded part, and may be fixed to the short-side second folded portion 47 by the screw 61 that is inserted from the bottom plate 14a.

<Other Embodiments>

The embodiments according to the present invention have been described. The present invention is not limited to the embodiments explained in the above description with reference to the drawings. The following embodiments may be included in the technical scope of the present invention, for example.

(1) In the above embodiments, the short-side second folded portion 36 and the long-side second folded portion 32 are formed on the short-side outer rim 21a and the long-side outer rim 21b of the chassis 14, respectively. However, the long-side second folded portion 32 may be formed only on the long-side outer rim 21b according to the strength required for the chassis 14. In this case, the short-side outer rim 21a has a folding configuration comprising only the first folded portion 35. Or the short-side second folded portion 36 may be formed only on the short-side outer rim 21a.

(2) In the second embodiment, the reinforcing plate 50 is attached to the short-side outer rim 21a and the long-side outer rim 21b of the chassis 14 respectively. However, the reinforcing plate 50 may be attached only to the long-side outer rim 21b according to the strength required for the chassis 14. Or the reinforcing plate 50 may be attached only to the short-side outer rim 21a.

(3) In the above embodiments, the cold cathode tubes 17 are used as light sources. However, other types of light sources including hot cathode tubes can be used.

The invention claimed is:

1. A lighting device comprising:
a plurality of light sources; and
a chassis configured to accommodate the light sources, wherein:
the chassis includes a flat bottom plate and an outer rim that is formed at an edge of the bottom plate and formed by bending a plate member;
the outer rim includes a first folded portion and a second folded portion that is formed by further folding the plate member that includes the first folded portion; and
the first folded portion is folded in a substantially U shape, and the second folded portion is provided inside the substantially U shape of the first folded portion.

2. The lighting device according to claim 1, wherein the second folded portion is formed at the outer rim that is provided along a long-side direction of the chassis.

3. The lighting device according to claim 1, wherein the second folded portion is formed at the outer rim that is provided along a short-side direction of the chassis.

4. The lighting device according to claim 1, wherein:
the first folded portion includes a first plate portion, a second plate portion and a third plate portion;
the first plate portion extends upwardly from the bottom plate of the chassis;
the second plate portion continues from the first plate portion and extends in a direction crossing the first plate portion;
the third plate portion continues from the second plate portion and extends downwardly from the second plate portion toward the bottom plate; and
the second folded portion includes a substantially U shape portion so as to be projected from the third plate portion to overlap the second plate portion.

5. The lighting device according to claim 1, wherein:
the first folded portion includes a first plate portion, a second plate portion and a third plate portion;
the first plate portion extends upwardly from the bottom plate of the chassis;
the second plate portion continues from the first plate portion and extends in a direction crossing the first plate portion;
the third plate portion continues from the second plate portion and extended downwardly from the second plate portion to the bottom plate; and
the second folded portion includes a substantially U shape portion so as to be projected from the second plate portion to overlap the first plate portion.

6. The lighting device according to claim 1, wherein:
the first folded portion includes a first plate portion, a second plate portion and a third plate portion;
the first plate portion extends upwardly from the bottom plate of the chassis;
the second plate portion continues from the first plate portion and extends in a direction crossing the first plate portion;
the third plate portion continues from the second plate portion and extends downwardly from the second plate portion toward the bottom plate; and
the second folded portion has a substantially U shape portion so as to be projected from the third plate portion to overlap the bottom plate of the chassis.

7. The lighting device according to claim 1, wherein:
the outer rim includes a core member that extends in a longitudinal direction of the outer rim; and
the core member is provided inside a folded part of the first folded portion and/or the second folded portion.

8. The lighting device according to claim 1, wherein a distance between the light sources and the bottom plate is 2.5 mm or less.

9. The lighting device according to claim 1, wherein a height of the outer rim in a vertical direction with respect to a plate surface of the bottom plate is 10.0 mm or less.

10. A display device comprising:
the lighting device according to claim 1; and
a display panel configured to provide display using light from the lighting device.

11. The display device according to claim 10, wherein the display panel is a liquid crystal display using liquid crystal.

12. A television receiver comprising the display device according to claim 10.

13. The lighting device according to claim 1, wherein:
the outer rim includes a core member that extends in a longitudinal direction of the outer rim; and
the core member is provided inside a folded part of the first folded portion.

14. The lighting device according to claim 1, wherein:
the outer rim includes a core member that extends in a longitudinal direction of the outer rim; and
the core member is provided inside a folded part of the second folded portion.

* * * * *